United States Patent
Freudenberg et al.

(10) Patent No.: US 12,250,937 B2
(45) Date of Patent: Mar. 18, 2025

(54) DEVICE AND METHOD FOR ATTRACTING AND TRAPPING FLYING INSECTS

(71) Applicant: Ecolab USA Inc., St. Paul, MN (US)

(72) Inventors: Jared Freudenberg, St. Louis Park, MN (US); Emory H. Matts, Rowlett, TX (US); Ronald D. Jungmann, Oakdale, MN (US); Staci Johnston, Burnsville, MN (US); Matthew Rhodes, Minneapolis, MN (US)

(73) Assignee: ECOLAB USA INC., Saint Paul, MN (US)

( * ) Notice: Subject to any disclaimer, the term of this patent is extended or adjusted under 35 U.S.C. 154(b) by 472 days.

(21) Appl. No.: 17/203,369

(22) Filed: Mar. 16, 2021

(65) Prior Publication Data
US 2021/0204536 A1    Jul. 8, 2021

Related U.S. Application Data

(63) Continuation of application No. 15/165,936, filed on May 26, 2016, now abandoned.

(60) Provisional application No. 62/173,760, filed on Jun. 10, 2015, provisional application No. 62/168,320, filed on May 29, 2015.

(51) Int. Cl.
| | | |
|---|---|---|
| A01M 1/14 | (2006.01) | |
| A01M 1/04 | (2006.01) | |
| A01M 1/22 | (2006.01) | |

(52) U.S. Cl.
CPC ............. *A01M 1/04* (2013.01); *A01M 1/145* (2013.01); *A01M 1/223* (2013.01); *A01M 2200/012* (2013.01)

(58) Field of Classification Search
CPC ................................ A01M 1/145; A01M 1/04
See application file for complete search history.

(56) References Cited

U.S. PATENT DOCUMENTS

| | | | |
|---|---|---|---|
| 979,329 | A | 12/1910 | Müller |
| D269,632 | S | 7/1983 | Robertson et al. |
| 4,949,501 | A | 8/1990 | Larkin |

(Continued)

FOREIGN PATENT DOCUMENTS

| | | |
|---|---|---|
| AU | 1163295 A1 | 8/1995 |
| AU | 736705 B2 | 11/1998 |

(Continued)

OTHER PUBLICATIONS

"About Black Light" Insect-o-cutor (Year: 2006).*

(Continued)

*Primary Examiner* — Magdalena Topolski
(74) *Attorney, Agent, or Firm* — Merchant & Gould P.C.

(57) ABSTRACT

A trap for immobilizing, killing, or containing arthropods comprises a housing having walls and at least one opening, where the walls define an interior space; and a light source comprising a directional light source mounted in the interior space. The light source is constructed to emit light at one or more wavelengths ranging from 350 to 500 nm. The light source is positioned so that a majority of the light emitted from the light source is directed at one or more surfaces in the interior space. The trap also comprises a suppression element mounted in the interior space and constructed to immobilize, kill, or contain arthropods.

17 Claims, 19 Drawing Sheets

(56) References Cited

U.S. PATENT DOCUMENTS

| | | |
|---|---|---|
| 5,044,112 A | 9/1991 | Williams |
| 5,111,610 A | 5/1992 | Morisset |
| 5,170,583 A | 12/1992 | Coaker et al. |
| 5,205,063 A | 4/1993 | Sutherst et al. |
| 5,205,064 A | 4/1993 | Nolen |
| 5,231,792 A | 8/1993 | Warner |
| RE34,402 E | 10/1993 | Williams |
| 5,251,397 A | 10/1993 | Exum et al. |
| 5,255,468 A | 10/1993 | Cheshire, Jr. |
| 5,272,831 A | 12/1993 | Willis |
| 5,274,609 A | 12/1993 | Bradley |
| 5,274,949 A | 1/1994 | Beaton |
| 5,301,456 A | 4/1994 | Jobin et al. |
| 5,301,458 A | 4/1994 | Deyoreo et al. |
| 5,311,696 A | 5/1994 | Gauthier et al. |
| 5,311,697 A | 5/1994 | Cavanaugh et al. |
| 5,323,556 A | 6/1994 | Carle |
| 5,327,675 A | 7/1994 | Butler et al. |
| 5,335,445 A | 8/1994 | Kuepper |
| 5,339,007 A | 8/1994 | Walton |
| 5,347,748 A | 9/1994 | Moreland et al. |
| 5,353,542 A | 10/1994 | Vaudry |
| 5,365,690 A | 11/1994 | Nelson et al. |
| 5,392,558 A | 2/1995 | Blomquist |
| 5,425,197 A | 6/1995 | Smith |
| 5,490,349 A | 2/1996 | Muramatsu |
| 5,513,465 A | 5/1996 | Demarest et al. |
| 5,526,604 A | 6/1996 | Sutherst et al. |
| 5,528,049 A | 6/1996 | Callahan |
| 5,540,011 A | 7/1996 | Groom et al. |
| 5,570,537 A | 11/1996 | Black et al. |
| 5,608,987 A | 3/1997 | Meyer |
| 5,634,292 A | 6/1997 | Kitterman |
| 5,647,164 A | 7/1997 | Yates |
| 5,651,211 A | 7/1997 | Regan et al. |
| D388,605 S | 1/1998 | Callahan et al. |
| D395,746 S | 7/1998 | Barackman |
| 5,857,282 A | 1/1999 | Odintsov |
| 5,896,695 A | 4/1999 | Walker |
| 5,915,948 A | 6/1999 | Kunze et al. |
| 5,915,949 A | 6/1999 | Johnson |
| 5,950,355 A | 9/1999 | Gilbert |
| 5,974,727 A | 11/1999 | Gilbert |
| 5,987,809 A | 11/1999 | Cheok |
| 5,992,087 A | 11/1999 | Chu et al. |
| D418,159 S | 12/1999 | Nakazawa et al. |
| 6,041,543 A | 3/2000 | Howse |
| 6,108,966 A | 8/2000 | Otomo et al. |
| 6,134,826 A | 10/2000 | Mah |
| 6,195,932 B1 | 3/2001 | Aicher |
| 6,199,315 B1 | 3/2001 | Suzue et al. |
| 6,199,316 B1 | 3/2001 | Coventry |
| 6,327,810 B1 | 12/2001 | Howse |
| 6,397,515 B1 | 6/2002 | Brown et al. |
| D460,106 S | 7/2002 | Yamada et al. |
| 6,421,952 B1 | 7/2002 | Vascocu |
| 6,463,693 B1 | 10/2002 | Weisner |
| 6,502,347 B1 | 1/2003 | Carver, Sr. |
| D470,769 S | 2/2003 | Holthaus et al. |
| 6,530,172 B2 | 3/2003 | Lenz |
| 6,560,918 B2 | 5/2003 | Nelson |
| 6,560,919 B2 | 5/2003 | Burrows et al. |
| 6,568,124 B1 | 5/2003 | Wilbanks |
| 6,568,125 B2 | 5/2003 | Kleinhenz |
| 6,574,914 B2 | 6/2003 | Smith |
| 6,594,944 B2 | 7/2003 | Chura |
| 6,655,078 B2 | 12/2003 | Winner et al. |
| 6,655,080 B2 | 12/2003 | Spiro et al. |
| 6,688,035 B1 | 2/2004 | Shichman |
| 6,722,080 B2 | 4/2004 | Carter |
| 6,758,009 B1 | 7/2004 | Warner |
| 6,766,611 B2 | 7/2004 | Prince |
| 6,772,556 B1 | 8/2004 | Liu |
| 6,786,001 B1 | 9/2004 | Piper et al. |
| 6,789,351 B2 | 9/2004 | Chrestman |
| 6,817,139 B1 | 11/2004 | Powell et al. |
| 6,860,061 B2 | 3/2005 | Nosse et al. |
| 6,871,443 B2 | 3/2005 | Lambert et al. |
| 6,874,273 B1 | 4/2005 | Weisenburg, III |
| 6,886,292 B2 | 5/2005 | Studer et al. |
| 6,898,896 B1 | 5/2005 | McBride et al. |
| 6,910,298 B2 | 6/2005 | Schneidmiller |
| 6,920,716 B2 | 7/2005 | Kollars, Jr. et al. |
| 7,024,815 B1 | 4/2006 | Visagie |
| 7,036,268 B2 | 5/2006 | Taylor et al. |
| 7,059,081 B2 | 6/2006 | Nourigat |
| 7,073,287 B2 | 7/2006 | Lau |
| D531,212 S | 10/2006 | Hegge |
| 7,143,542 B2 | 12/2006 | Taylor et al. |
| 7,191,560 B2 | 3/2007 | Harris |
| D540,667 S | 4/2007 | Duranthon |
| 7,222,453 B2 | 5/2007 | Uhl |
| 7,234,268 B2 | 6/2007 | Welch |
| D548,591 S | 8/2007 | Learn et al. |
| 7,281,350 B2 | 10/2007 | Wilbanks |
| 7,284,350 B2 | 10/2007 | Nelson et al. |
| 7,303,300 B2 | 12/2007 | Dowling et al. |
| 7,363,745 B2 | 4/2008 | Hsin-Chang et al. |
| 7,383,660 B2 | 6/2008 | Greening |
| 7,441,368 B1 | 10/2008 | Rieger |
| 7,503,675 B2 | 3/2009 | Demarest et al. |
| 7,543,408 B2 | 6/2009 | Lin |
| 7,607,255 B2 | 10/2009 | Hu |
| 7,784,215 B2 | 8/2010 | Cohnstaedt et al. |
| 7,841,131 B2 | 11/2010 | Nelson |
| 8,028,467 B2 | 10/2011 | Bagnall et al. |
| 8,079,175 B2 | 12/2011 | Calkins et al. |
| 8,136,290 B2 | 3/2012 | Scholz |
| 8,240,082 B1 | 8/2012 | Fall |
| 8,245,438 B2 | 8/2012 | Kelders |
| 8,276,314 B2 | 10/2012 | Duehl et al. |
| 8,281,514 B2 | 10/2012 | Fleming |
| 8,327,577 B2 | 12/2012 | Liang |
| 8,341,873 B2 | 1/2013 | Frisch |
| 8,402,691 B2 | 3/2013 | Coventry |
| D686,278 S | 7/2013 | Ito |
| 8,572,890 B1 | 11/2013 | Lark et al. |
| 8,663,619 B2 | 3/2014 | Zhang et al. |
| 8,739,461 B2 | 6/2014 | Studer et al. |
| 8,793,928 B2 | 8/2014 | Larsen |
| 8,800,198 B2 | 8/2014 | Frisch |
| 8,875,437 B1 | 11/2014 | Xie |
| 8,978,290 B2 | 3/2015 | Wright |
| D771,184 S | 11/2016 | Yamashita et al. |
| D818,559 S | 5/2018 | Freudenberg et al. |
| D861,825 S | 10/2019 | Freudenberg et al. |
| 2002/0005006 A1 | 1/2002 | Phillips |
| 2002/0020105 A1 | 2/2002 | Sharpe |
| 2002/0074559 A1 | 6/2002 | Dowling et al. |
| 2002/0078620 A1 | 6/2002 | Nelson et al. |
| 2003/0079398 A1 | 5/2003 | Holmes |
| 2003/0152603 A1 | 8/2003 | Johnson |
| 2003/0154664 A1 | 8/2003 | Beck et al. |
| 2003/0184442 A1 | 10/2003 | Gardner, Jr. et al. |
| 2003/0208952 A1 | 11/2003 | Dible |
| 2004/0001870 A1 | 1/2004 | Durand et al. |
| 2004/0068917 A1 | 4/2004 | Chan |
| 2004/0148846 A1 | 8/2004 | Moore |
| 2004/0148848 A1 | 8/2004 | Bertani |
| 2004/0159040 A1 | 8/2004 | Chen |
| 2004/0181997 A1 | 9/2004 | Lee et al. |
| 2005/0028429 A1* | 2/2005 | Schneidmiller ....... A01M 1/106 43/65 |
| 2005/0044777 A1 | 3/2005 | Hiscox |
| 2005/0055870 A1 | 3/2005 | Yelverton |
| 2005/0102888 A1 | 5/2005 | Curnow et al. |
| 2005/0172542 A1 | 8/2005 | Rose, Sr. |
| 2005/0210735 A1 | 9/2005 | Harmer et al. |
| 2005/0223625 A1 | 10/2005 | Whitlow et al. |
| 2006/0021274 A1 | 2/2006 | Chen |
| 2006/0107583 A1 | 5/2006 | Wu |
| 2006/0150472 A1 | 7/2006 | Harris |
| 2006/0179708 A1 | 8/2006 | Garland |
| 2006/0218851 A1 | 10/2006 | Weiss et al. |

(56) References Cited

U.S. PATENT DOCUMENTS

| | | |
|---|---|---|
| 2006/0225338 A1 | 10/2006 | Mursic et al. |
| 2006/0248783 A1 | 11/2006 | Lindquist et al. |
| 2007/0011940 A1 | 1/2007 | Chen et al. |
| 2007/0039234 A1 | 2/2007 | Reime |
| 2007/0039236 A1 | 2/2007 | Geier et al. |
| 2007/0056207 A1 | 3/2007 | Chen |
| 2007/0107298 A1 | 5/2007 | Miao et al. |
| 2007/0124987 A1 | 6/2007 | Brown et al. |
| 2007/0124988 A1 | 6/2007 | Spiro et al. |
| 2007/0151141 A1 | 7/2007 | Lin |
| 2007/0169401 A1 | 7/2007 | Chyun |
| 2007/0175085 A1 | 8/2007 | Chen |
| 2008/0010896 A1 | 1/2008 | Lin |
| 2008/0034642 A1 | 2/2008 | Chen |
| 2008/0034643 A1 | 2/2008 | Chen |
| 2008/0086932 A1 | 4/2008 | Cook et al. |
| 2008/0134568 A1 | 6/2008 | Cowan et al. |
| 2008/0141578 A1 | 6/2008 | Chen et al. |
| 2008/0229652 A1 | 9/2008 | Willcox et al. |
| 2008/0236028 A1 | 10/2008 | McBride et al. |
| 2009/0031612 A1 | 2/2009 | Hubbard et al. |
| 2009/0038207 A1 | 2/2009 | Lin |
| 2009/0100743 A1 | 4/2009 | Prater |
| 2009/0128000 A1 | 5/2009 | Wilson et al. |
| 2009/0236997 A1 | 9/2009 | Liu |
| 2009/0277073 A1 | 11/2009 | Chen |
| 2009/0277074 A1 | 11/2009 | Noronha |
| 2009/0288333 A1 | 11/2009 | Johnston et al. |
| 2010/0024278 A1 | 2/2010 | Simchoni-Barak et al. |
| 2010/0071257 A1 | 3/2010 | Tsai |
| 2010/0088948 A1 | 4/2010 | Yeh |
| 2010/0175307 A1 | 7/2010 | Götschi |
| 2010/0212211 A1 | 8/2010 | Scheubeck et al. |
| 2010/0229459 A1 | 9/2010 | Simchoni-Barak et al. |
| 2010/0263260 A1 | 10/2010 | Engelbrecht et al. |
| 2010/0287816 A1 | 11/2010 | Abelbeck |
| 2011/0005123 A1 | 1/2011 | Will |
| 2011/0005124 A1 | 1/2011 | Gelette et al. |
| 2011/0030266 A1 | 2/2011 | Roy et al. |
| 2011/0030267 A1 | 2/2011 | Nolen et al. |
| 2011/0041384 A1 | 2/2011 | Willcox et al. |
| 2011/0078943 A1 | 4/2011 | Larsen |
| 2011/0099885 A1 | 5/2011 | Maganga |
| 2011/0283599 A1 | 11/2011 | Wu et al. |
| 2011/0296740 A1 | 12/2011 | Yamada et al. |
| 2012/0055073 A1 | 3/2012 | Darby |
| 2012/0066958 A1 | 3/2012 | McGinnis, Jr. et al. |
| 2012/0159836 A1 | 6/2012 | Brown |
| 2012/0176765 A1 | 7/2012 | Uchida et al. |
| 2012/0204475 A1 | 8/2012 | Schneidmiller et al. |
| 2012/0262914 A1 | 10/2012 | Block et al. |
| 2012/0266519 A1 | 10/2012 | Wright |
| 2012/0317868 A1 | 12/2012 | Johnston et al. |
| 2013/0097918 A1 | 4/2013 | Coventry |
| 2013/0169146 A1 | 7/2013 | Aoki et al. |
| 2013/0283671 A1 | 10/2013 | Czokajlo et al. |
| 2013/0298445 A1 | 11/2013 | Aoki et al. |
| 2013/0300280 A1 | 11/2013 | Toda et al. |
| 2013/0301258 A1 | 11/2013 | Aoki et al. |
| 2013/0326933 A1 | 12/2013 | Jung |
| 2014/0026467 A1 | 1/2014 | Kaye |
| 2014/0068999 A1 | 3/2014 | Singleton |
| 2014/0137462 A1 | 5/2014 | Rocha |
| 2014/0165452 A1 | 6/2014 | Rocha |
| 2014/0169138 A1 | 6/2014 | Lee et al. |
| 2014/0223803 A1 | 8/2014 | Hariyama et al. |
| 2015/0144713 A1 | 5/2015 | Formico et al. |
| 2016/0021865 A1 | 1/2016 | Koo et al. |
| 2016/0050901 A1 | 2/2016 | Pugh |
| 2016/0212984 A1 | 7/2016 | Fang et al. |
| 2016/0245916 A1 | 8/2016 | Weber-Grabau |
| 2016/0345569 A1 | 12/2016 | Freudenberg et al. |

FOREIGN PATENT DOCUMENTS

| | | |
|---|---|---|
| AU | 4447799 A1 | 3/2000 |
| AU | 2001100161 A4 | 11/2001 |
| AU | 2004201752 | 5/2004 |
| AU | 2006100611 A4 | 8/2006 |
| AU | 2007203305 A1 | 2/2008 |
| CA | 2067825 A1 | 10/1993 |
| CA | 2073163 A1 | 1/1994 |
| CA | 2099389 A1 | 12/1994 |
| CA | 2126425 A1 | 12/1994 |
| CA | 2183807 A1 | 2/1997 |
| CA | 2259366 A1 | 7/2000 |
| CA | 2511015 A1 | 12/2005 |
| CA | 2533004 A1 | 7/2006 |
| CA | 2688976 A1 | 6/2011 |
| CN | 101589701 | 12/2009 |
| CN | 203735319 | 7/2014 |
| CN | 101506404 | 3/2015 |
| DE | 19540804 A1 | 8/1996 |
| DE | 29619331 U1 | 2/1997 |
| DE | 29716124 U1 | 1/1998 |
| DE | 29816743 U1 | 2/1999 |
| DE | 19835059 A1 | 2/2000 |
| DE | 20010275 U1 | 10/2000 |
| DE | 20213435 U1 | 1/2003 |
| DE | 10236531 A1 | 2/2004 |
| DE | 202004003142 U1 | 6/2004 |
| DE | 202006001368 U1 | 3/2006 |
| DE | 202008017473 U1 | 9/2009 |
| DE | 102009006230 A1 | 7/2010 |
| DE | 202012004898 U1 | 8/2013 |
| EP | 0629344 | 12/1994 |
| EP | 0746977 A1 | 12/1996 |
| EP | 0976323 A2 | 2/2000 |
| EP | 1138199 A2 | 10/2001 |
| EP | 1203530 A1 | 5/2002 |
| EP | 1321036 A2 | 6/2003 |
| EP | 1358797 A2 | 11/2003 |
| EP | 1457111 A1 | 9/2004 |
| EP | 1477061 A1 | 11/2004 |
| EP | 1884711 | 2/2006 |
| EP | 1716753 A1 | 11/2006 |
| EP | 2100503 A1 | 9/2009 |
| EP | 2319302 A2 | 5/2011 |
| FR | 2775159 A1 | 8/1999 |
| FR | 2798557 A1 | 3/2001 |
| FR | 2839854 A1 | 11/2003 |
| FR | 2855014 A1 | 11/2004 |
| FR | 2900793 A1 | 11/2007 |
| GB | 2266649 A | 11/1993 |
| GB | 2275409 A | 8/1994 |
| GB | 2282042 A | 3/1995 |
| GB | 2420957 A | 6/2006 |
| GB | 2433690 A | 7/2007 |
| GB | 2442934 A | 4/2008 |
| GB | 2447969 A | 10/2008 |
| GB | 2456585 A | 7/2009 |
| GB | 2474274 A | 4/2011 |
| JP | 3114306 U | 10/2005 |
| JP | 2006-230258 A | 9/2006 |
| JP | 2007-129944 A | 5/2007 |
| JP | 2007-289122 A | 11/2007 |
| JP | 2010-504092 A | 2/2010 |
| JP | 2012-502662 A | 2/2012 |
| KR | 10-2008-0086083 A | 9/2008 |
| KR | 20090085394 * | 8/2009 |
| KR | 20-0453375 Y1 | 4/2011 |
| KR | 10-2013-0074781 A | 7/2013 |
| WO | 94/03053 A1 | 2/1994 |
| WO | 96/08170 A1 | 3/1996 |
| WO | 97/01272 A1 | 1/1997 |
| WO | 97/10709 A1 | 3/1997 |
| WO | 97/20460 A1 | 6/1997 |
| WO | 97/37532 A1 | 10/1997 |
| WO | 97/38574 A1 | 10/1997 |
| WO | 99/34671 A1 | 7/1999 |
| WO | 01/01768 A1 | 1/2001 |
| WO | 01/22813 A2 | 4/2001 |

(56) References Cited

FOREIGN PATENT DOCUMENTS

| | | |
|---|---|---|
| WO | 2004/010762 A2 | 2/2004 |
| WO | WO-2005038540 A2 * | 4/2005 ............ A01M 1/145 |
| WO | 2005/048703 A1 | 6/2005 |
| WO | 2005/053389 A1 | 6/2005 |
| WO | 2006/029502 A1 | 3/2006 |
| WO | 2006/056729 A1 | 6/2006 |
| WO | 2006/121346 A1 | 11/2006 |
| WO | 2006/135957 A1 | 12/2006 |
| WO | 2007/001170 A1 | 1/2007 |
| WO | 2007/045879 A1 | 4/2007 |
| WO | 2007/052948 A1 | 5/2007 |
| WO | 2007/079619 A1 | 7/2007 |
| WO | 2007/135692 A2 | 11/2007 |
| WO | 2008/035304 A2 | 3/2008 |
| WO | 2008/050934 A1 | 5/2008 |
| WO | 2008/073121 A2 | 6/2008 |
| WO | 2009/089828 A1 | 7/2009 |
| WO | 2009/099278 A2 | 8/2009 |
| WO | 2009/116017 A1 | 9/2009 |
| WO | 2010/022545 A1 | 3/2010 |
| WO | 2010/033917 A2 | 3/2010 |
| WO | 2010/081406 A1 | 7/2010 |
| WO | 2010/098377 A1 | 9/2010 |
| WO | 2010/120034 A1 | 10/2010 |
| WO | 2010/137767 A1 | 12/2010 |
| WO | 2011/004782 A1 | 1/2011 |
| WO | 2011/152609 A2 | 12/2011 |
| WO | 2012/098484 A1 | 7/2012 |
| WO | 2012/111981 A2 | 8/2012 |
| WO | 2012/140320 A1 | 10/2012 |
| WO | 2013/004132 A1 | 1/2013 |
| WO | 2013/004625 A1 | 1/2013 |
| WO | 2013/098571 A1 | 7/2013 |
| WO | 2013/120130 A1 | 8/2013 |
| WO | 2013/132230 A1 | 9/2013 |
| WO | 2014/134371 A1 | 9/2014 |

OTHER PUBLICATIONS

Extended European Search Report for Application No. 16804072.3 mailed Jan. 30, 2019.
Extended European Search Report for Application No. 20175683.0 mailed Sep. 9, 2020.
International Search Report and Written Opinion for Application No. PCT/US2016/034425 mailed Sep. 5, 2016.

* cited by examiner

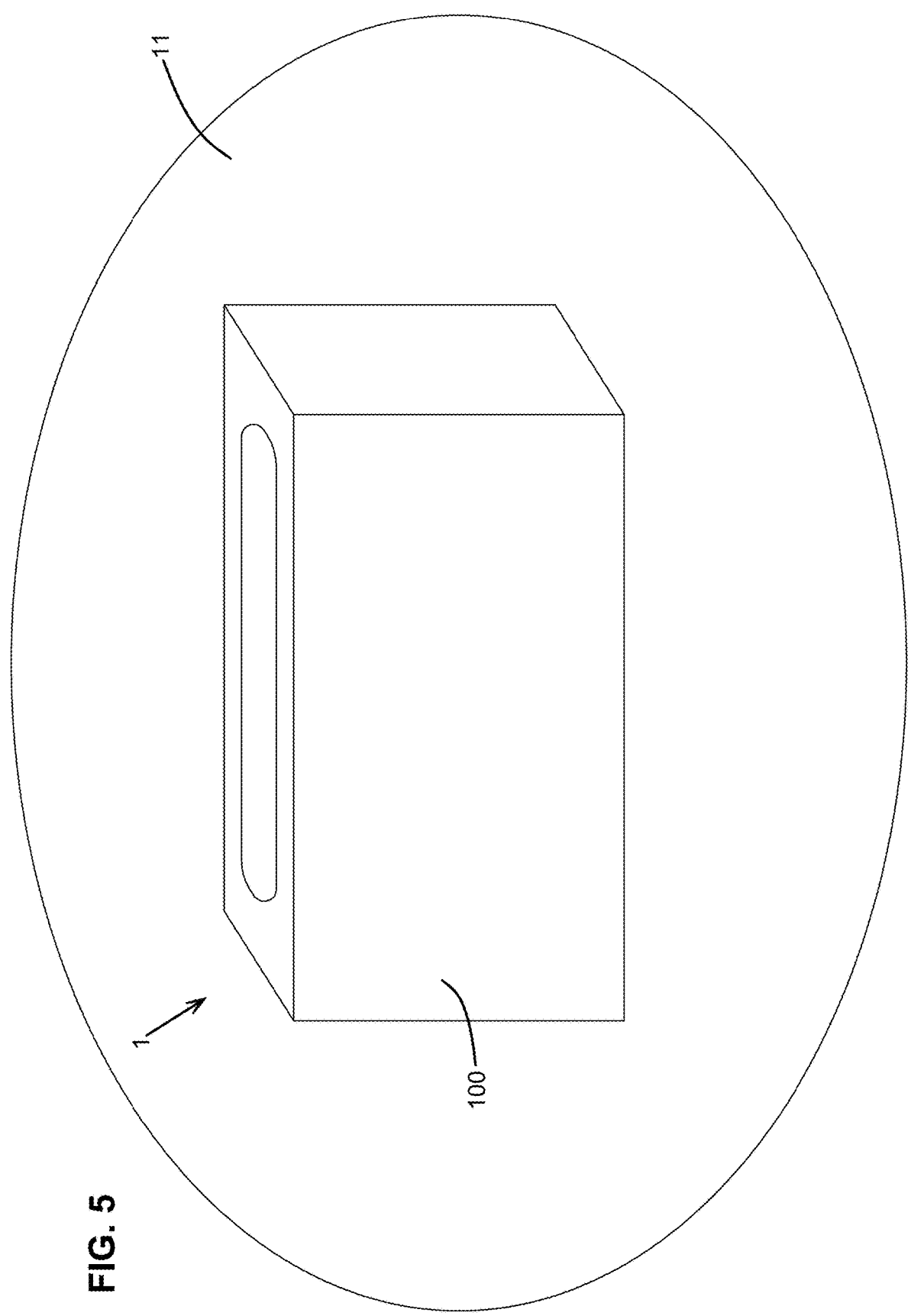

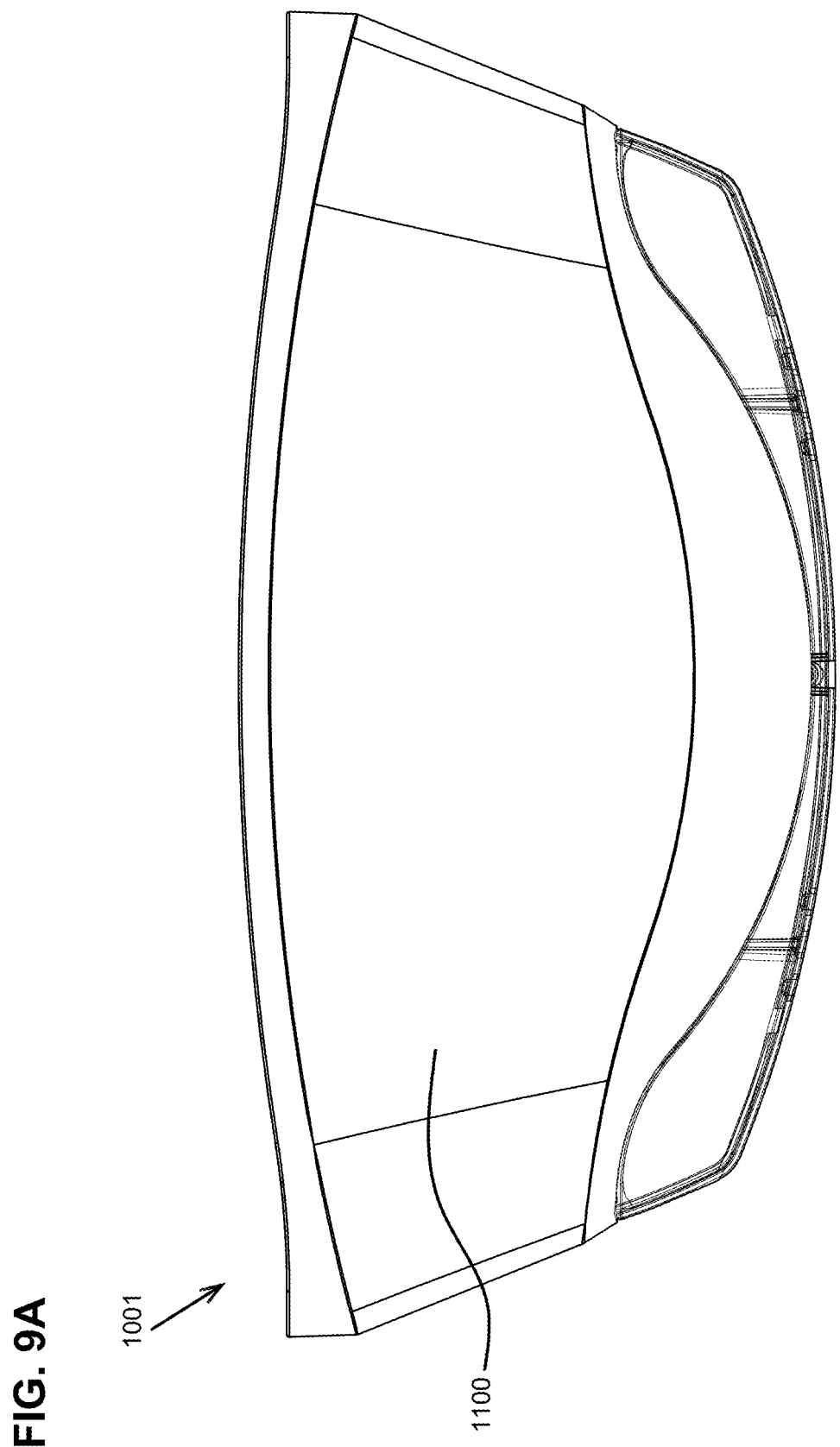

DEVICE AND METHOD FOR ATTRACTING AND TRAPPING FLYING INSECTS

CROSS-REFERENCED APPLICATIONS

This application is a continuation of U.S. application Ser. No. 15/165,936, filed May 26, 2016, now abandoned, which is a non-provisional application of U.S. Provisional Application No. 62/173,760, filed Jun. 10, 2015 and U.S. Provisional Application No. 62/168,320, filed May 29, 2015, the entire disclosures of which are incorporated herein by reference.

FIELD

The present disclosure relates to methods and devices for attracting, trapping, and killing flying insects, including common house flies. The present disclosure further relates to devices including an illuminated trap with one or more light sources constructed to attract and immobilize flying insects.

BACKGROUND

Insect traps with light sources are commonly known for attracting, trapping, immobilizing and/or killing flying insects. Phototactic insects, such as many flies and other flying insects, move toward light and may be attracted to a trap utilizing a light source. Different insects may be attracted to light at different wavelengths. Flies (e.g., common flies, filth flies, and house flies), for example, are known to be attracted to light that includes ultraviolet (UV or UVA) light in the range of 350 to 370 nm, or in particular at 365 nm. Fruit flies, on the other hand, respond most strongly to blue and green light in the range of 470 to 560 nm, and moths (e.g., Indian meal moths) to blue light in the range of 470 to 500 nm. Some wavelengths of light may also increase mortality of flying pests in the early stages of life and decrease the life of adults.

Improved light sources utilizing light emitting diodes (LEDs) have become more widely available. However, LEDs have different properties than conventional incandescent and fluorescent light sources that do not lend themselves for use in previous insect traps. It is against this background that the present disclosure is made.

SUMMARY

The present disclosure relates to a trap comprising a housing having walls and at least one opening, where the walls define an interior space; and a light source comprising a directional light source mounted in the interior space. The light source is constructed to emit light at one or more wavelengths ranging from 350 to 500 nm. The light source is positioned so that a majority of the light emitted from the light source is directed at one or more surfaces in the interior space. The trap also comprises a suppression element mounted in the interior space and constructed to immobilize, kill, or contain arthropods.

BRIEF DESCRIPTION OF DRAWINGS

FIG. 5 is a schematic depiction of an insect trap according to an embodiment.
FIG. 9A is a front view of an exemplary housing for an insect trap according to an embodiment.

Figure 1:
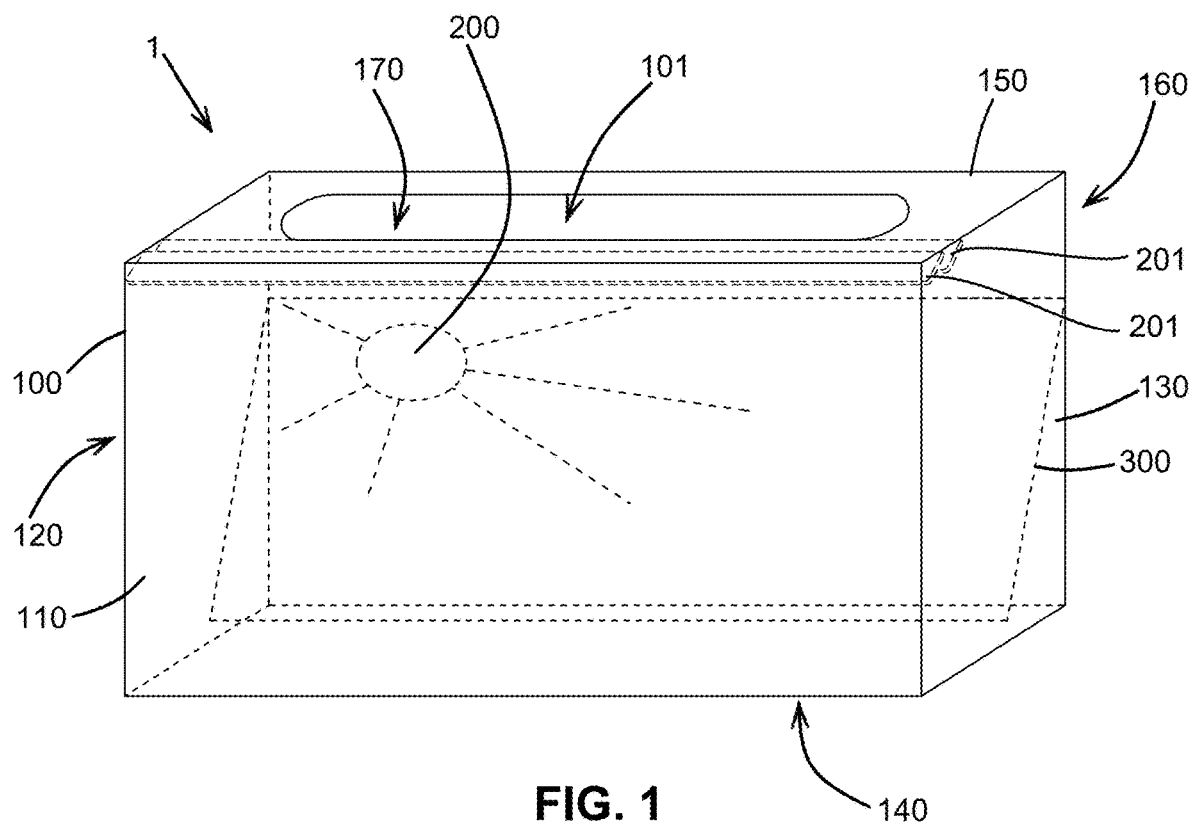
FIG. 1 is a schematic drawing of an insect trap according to an embodiment.

The various described features are not drawn to scale but are drawn to depict certain features relevant to the disclosure. Reference characters denote like features throughout the figures.

DETAILED DESCRIPTION

The present disclosure relates to methods and devices for attracting, trapping, and killing flying arthropods, such as common house flies and other insects. The devices include an illuminated trap with one or more light sources and one or more suppression elements constructed to attract and immobilize arthropods.

The term "insects" is used in describing the use of the methods and devices of this disclosure, but it will be readily understood by those skilled in the art that the methods and devices can also be used to attract, trap, and kill other arthropods.

The term "about" is used here in conjunction with numeric values to include normal variations in measurements as expected by persons skilled in the art, and is understood have the same meaning as "approximately" and to cover a typical margin of error, such as ±5% of the stated value.

The term "directional light" is used here to refer to light that is emitted in one direction from a "directional light source," as opposed to light that is emitted in multiple directions. For the purposes of this disclosure, "directional light" is used to refer to light beams that can be aimed or directed. Such light beams have a beam angle of less than 180° (e.g., about 90° or less). Beam angle is the width of the beam of light from the light source measured in degrees. The beam angle emanating from a parabolic ("PAR") light bulb is typically described as very narrow spot light if it is below 15°, as narrow spot light between 15°-30°, as spot light between 30°-60°, as flood light between 90°-120°, as wide flood light between 120°-160°, and as very wide flood light above 160°. An example of a directional light source is a LED. A single LED unit that is not coupled with a diffuser or a lens typically has a beam angle of about 20°-24°. Multiple LED units can be grouped together in light bulbs that may be constructed as directional lights, or where at least a portion of the light bulb is constructed as a directional light. Examples of light sources that typically emit light in multiple directions include fluorescent light bulbs, incandescent light bulbs, halogen light bulbs, and the like. For purposes of this disclosure, fluorescent, incandescent, and halogen light bulbs focused by the use of a cone diffuser are not considered "directional light sources."

The same or analogous reference numerals are used to denote the same part or its embodiments in the FIGURES. For example, reference numerals 100 and 100' are used to denote embodiments of the housing.

Many existing insect traps utilize fluorescent light bulbs because of their electrical efficiency and effectiveness in attracting flies. In nature, flies use UV light as a way to avoid predators. Flies will try to fly toward higher levels of UV light in order to get away from an animal that might be trying to eat the fly. Therefore, insect traps often utilize UV light to attract flies. However, fluorescent UV bulbs-much like natural sun light-emit also other wavelengths in addition to UV. LEDs, on the other hand, typically emit a very narrow band of light and do not emit many other wavelengths. Therefore, unlike natural light, LED UV lights emit few other wavelengths in addition to UV. LED lights also differ from natural sun light (and most other artificial light sources) in that LED lights provide a point-source of light that is different from the nonpoint-source light (e.g., sun light diffusing through the atmosphere) insects are used to seeing. While LEDs have many properties that make them a desirable replacement for other types of light bulbs (e.g., a long lifetime and low energy usage), some properties of the LEDs (e.g., directional light beam, small size, narrow wavelength range) do not lend themselves for use in an insect trap without accounting for these different features of an LED bulb. The present disclosure relates to insect traps that are constructed to achieve high effectiveness in attracting flies, while taking advantage of the qualities of LEDs.

The insect trap of the present disclosure includes a frame for housing the operational elements of the insect trap, including a light source, a power source, a suppression element, and optionally a bait location and pheromone agent. The frame may be constructed as a housing that defines an enclosure. The housing may include one or more openings that enable insects to enter the enclosure. The opening may be large enough to also enable maintenance of the insect trap, for example, by emptying the trap of dead insects and by switching out consumable elements, such as bait, glueboards, light sources, etc. Alternatively, the housing can include movable or removable pieces that can be opened to gain access to the interior. The housing can be constructed in any suitable size and shape that is capable of accommodating the operational elements of the insect trap.

The housing may be constructed such that a portion of the light emitted by the light source is visible to insects outside of the housing, thus attracting the insects to enter the enclosure. However, in some embodiments, the housing is constructed so that a majority of the light from the light source does not escape the enclosure. For example, a portion of the light may escape from the enclosure through the one or more openings on the housing, while a majority of the light illuminates surfaces inside the enclosure. In some preferred embodiments, light that exits the enclosure is directed at a wall adjacent to (e.g., behind and/or above) the insect trap. The housing may also be constructed to include one or more baffles positioned adjacent to the one or more openings so that the light leaving the enclosure is directed at the baffle.

The light emitted by the light source and illuminating the area near the insect trap attracts the insects to the trap. In some embodiments the opening is illuminated to create an attractive landing pad for the insects. The housing may optionally include a bait element, such as bait provided in a bait location, or a pheromone component to further enhance attractiveness to insects. If bait is used, the bait may further include insecticide. After insects enter the enclosure, they may become trapped and/or killed by the suppression element (e.g., a trapping device). The suppression element can comprise any suitable device, such as a glueboard or an electric zapper.

The light source can be selected so that the emitted light attracts insects into the insect trap. The light source can be constructed to emit light at a single wavelength or wavelength range (e.g., in the UV region), or at multiple wavelengths (e.g., UV and blue light, or UV and green light, or any other suitable combination), or across a range of wavelengths (e.g., from UV to green light). The wavelength can be adjustable and can be selected to target specific insects. Generally, flies (e.g., common flies, filth flies, house flies, etc.) are attracted to UV light in the range of 350 to 370 nm, or at 365 nm, whereas fruit flies respond most strongly to blue and green light in the range of 470 to 560 nm, and moths (e.g., Indian meal moths) to blue light in the range of 470 to 500 nm.

In some embodiments, the insect trap is configured to attract and immobilize house flies. In some other embodiments, the insect trap is configured to attract and immobilize other flying insects in addition to or instead of house flies, for example, fruit flies, phorid flies, or moths. Without wishing to be bound by theory, it is believed that the directionality of the light sources and their placement on the insect trap such that light is directed at surfaces of the enclosure (e.g., surfaces inside or adjacent to the enclosure), is effective to catch various types of flying insects, including common flies, for example, filth flies, house flies, phorid flies, fruit flies, and moths.

In one embodiment, the light source emits at least UV light (e.g., long wave UV, or UVA). For example, the light source can emit light at a wavelength of about 350 to about 450 nm, about 365 to about 425 nm, about 380 to about 410 nm, or about 385 to about 405 nm. In some embodiments, the light source also emits light at one or more other wave lengths, such as blue (about wavelength 450-500 nm) or green (about wavelength 495-570 nm), or at an intermediate range between visible and UV light. The light sources can be selected to emit light at about 360 to 380 nm, about 380 to about 385, at about 385 to about 410 nm, at about 405 to about 440 nm, at about 450 to 480 nm, at about 490 to 530 nm, and any combinations thereof. In one embodiment the insect trap includes at least one light LED source capable of emitting light at about 405 nm, or at about 400 to about 410 nm, or at about 385 to about 425 nm. The insect trap may include two, three, four, or more, of such light bulbs, and may additionally include other light sources. The light source may include LED lights capable of emitting light at multiple wave lengths, and can include a mechanism for selecting specific wavelengths to target specific insects.

The housing is constructed to provide an enclosure that accommodates the operational components of the insect trap. The operational components include at least a light source, a power source, and a suppression element, and optionally a bait component. However, some of the components, such as the power source, may be positioned outside of the enclosure. The housing can be of any suitable size and shape. A general box-shaped housing is shown schematically in FIGS. 1-8, but other shapes are, of course, possible. Alternative embodiments of the housing are shown in FIGS. 9A, 9B, 9C, 10, and 24.

Referring now to FIGS. 1-6, the insect trap 1 comprises a housing 100 defined generally by a front wall 110, side walls 120, 130, a bottom 140, and a top 150. The housing 100 can also be constructed such that no clear distinction exists between the front wall 110 and, for example, the side walls 120, 130, if the front and the sides form a continuous curved shape. In some embodiments the housing 100 further includes a back wall 160 that can be mounted to a vertical wall using fasteners 190. The mounting frame 50 can also be mounted to a vertical wall using fasteners. The housing 100 comprises at least one opening 170 that allows insects to enter the housing 100. The at least one opening 170 may be a single opening as shown in FIGS. 1 and 5-7, or a plurality of openings as shown, for example, in FIG. 10. The opening 170 may also provide access to the interior of the housing 100 to allow inspection and/or maintenance of the insect trap 1, and may be sized accordingly.

In some embodiments the opening 170 is positioned at or near the top of the housing 100. The housing 100 may also include two or more openings, which may be located on different sides of the housing 100. In some embodiments where the housing 100 includes two or more openings, at least one of the openings 170 is positioned at or near the top of the housing 100. In some embodiments, one or more of the walls (e.g., a side wall 120, 130, the top 150, or the bottom 140) is absent, providing the opening 170. The insect trap 1 may also be constructed with a frame 50 that does not provide an enclosure, but provides a mounting frame onto which the operational elements (light source 200, power source 250, and suppression element 300) can be mounted (see FIG. 8).

The insect trap 1 can be configured as a "land-and-crawl" trap, where insects land on or around the housing 100 and crawl into the interior space through the opening 170. The insect trap 1 can also be configured as a "fly-in" trap, where insects fly into the interior space through the opening 170. Alternatively, the insect trap 1 can be configured as a combination of "land-and-crawl" and "fly-in." Typically, to facilitate a "fly-in" trap, the opening 17 will be at least about three inches in its smallest dimension in a trap constructed for catching flies (e.g., house flies or similarly sized flies), or smaller for catching small flies (e.g., fruit flies or similarly sized flies). A "fly-in" trap may also include a landing surface mounted on the inside of the housing 100 for the insects to land on. In some embodiments, a glueboard 310 can serve as the landing surface.

The interior of the housing 100 (i.e., the enclosure) may be sized to facilitate the operational components of the insect trap 1. In some embodiments, the light source 200 includes one or more LED lights, which are generally smaller in size than incandescent or fluorescent lights and also require less power to operate. In such embodiments, the enclosure can be made smaller. On the other hand, the insect trap 1 can be outfitted with one or more batteries as the power source, which can also be housed inside the housing 100.

Figure 4A:
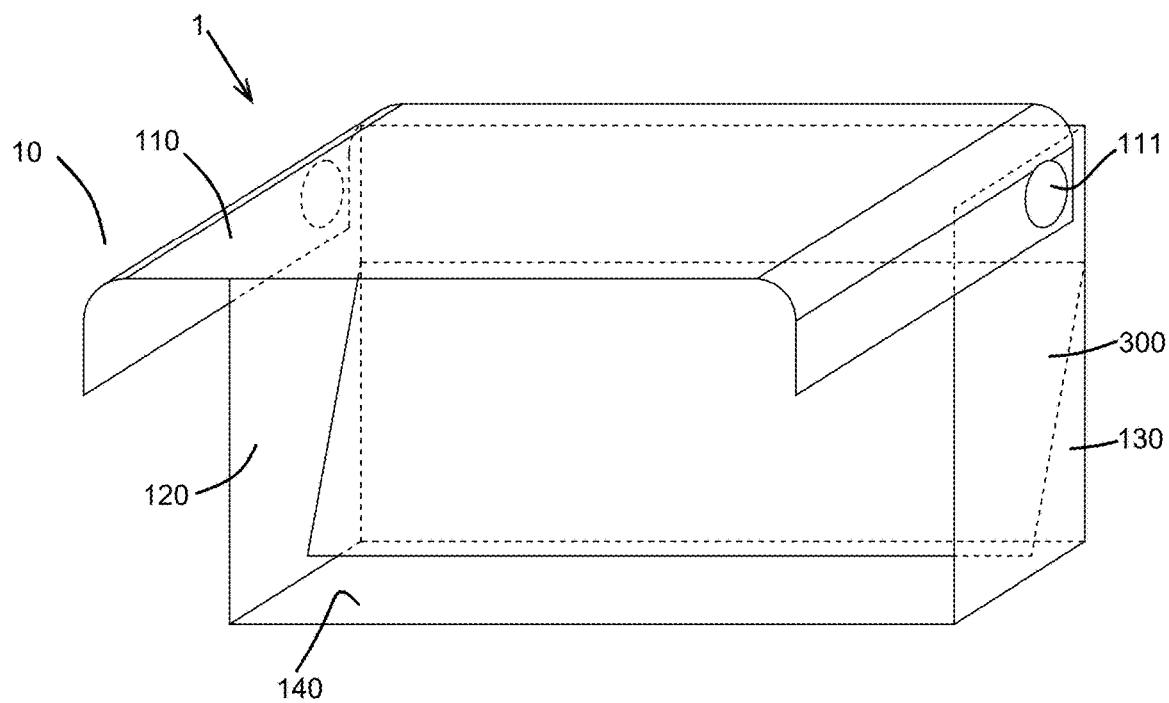
FIG. 4A is a semi-transparent perspective view of an insect trap with an open front cover according to an embodiment.
Figure 4B:
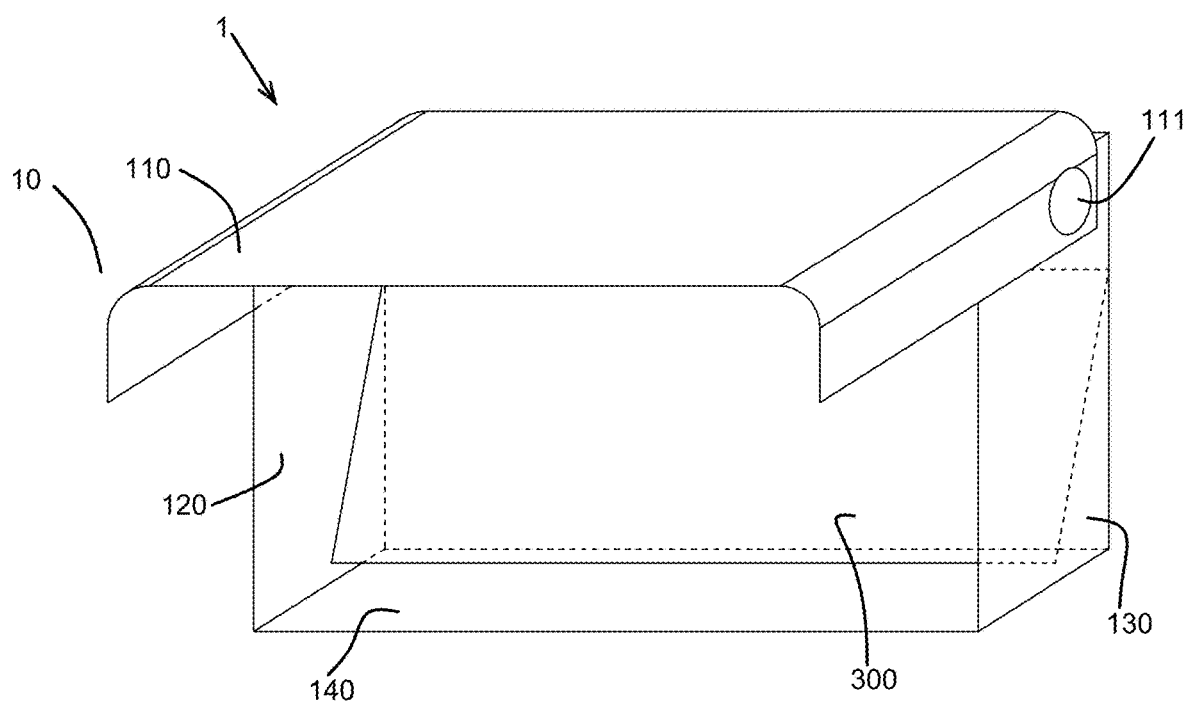
FIG. 4B is a perspective view of an insect trap with an open front cover according to an embodiment.

In some embodiments, the housing 100, 3100 is provided with a mechanism to access the interior of the housing 100. For example, the housing 100, 3100 can comprise a base 60, 3060 (e.g., comprising the back wall 160, 3160) and a front cover 10 (e.g., comprising the front wall 110, 3110) that is movably and/or removably attached to the base 60. The front cover 10, 3010 can be, for example, coupled with the base 60, 3060 by hinges 111 and/or a closure mechanism, as shown in FIGS. 4A and 4B, and in FIG. 24. The front cover 10, 3010 can be pivotably coupled with the base 60, 3060 so that the front cover 10, 3110 can be pivoted into an open position (shown in FIG. 24) and a closed position. The suppression element (e.g., glueboard), light source 200, optional bait location, and other interior components can be accessed when the front cover 10, 3110 is in the open position. The closure mechanism can be any suitable mechanism, such as a snap closure, a screw, a spring closure, a magnetic closure, etc. Alternatively, another part of the housing 100, e.g., one of the side walls 120, 130, can be coupled with the base 60 by a removable closure.

The insect trap 1 comprises one or more light sources 200. The light source 200 can include a socket 220 and a light bulb 210 mounted onto the socket 220. The light source 200 may comprise a plurality of light bulbs 210. In some embodiments, the light bulb 210 comprises a LED light. The light bulb 210 may be constructed from a single LED, or may be a light bulb with a plurality of LEDs mounted on a single bulb. Each LED in the plurality of LEDs can either be constructed to emit light at the same wave length or at different wave lengths. The light bulb 210 may also be of any suitable shape and size. For example, the light bulb 210 may be constructed to have a traditional "light bulb shape" or as a plug-shaped bulb, a tubular bulb, a spotlight style bulb, a strip, or as a single LED element. The shape and size of the light bulb 210 can be selected to fit a desired housing shape and size. For example, a strip-shaped light bulb 210 or a single LED can be used in a smaller housing with a slim profile, whereas a larger light bulb 210 can be selected for a larger housing. The light bulb may also be a multi-directional LED light bulb that includes a plurality of LED components directed at multiple directions from a central core. In other embodiments, the light source 200 comprises other types of lights, such as incandescent, fluorescent, or halogen lights.

Figure 7:
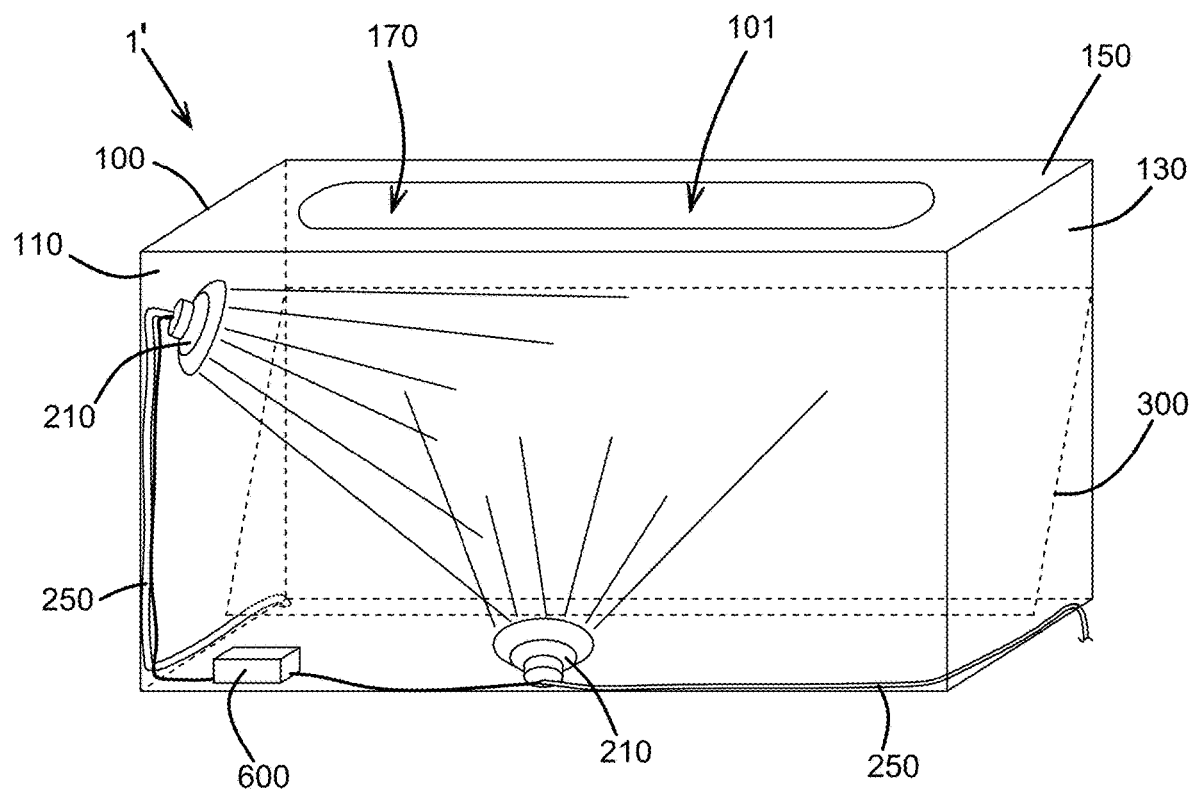
FIG. 7 is a schematic drawing of an insect trap according to an embodiment.
Figure 8:
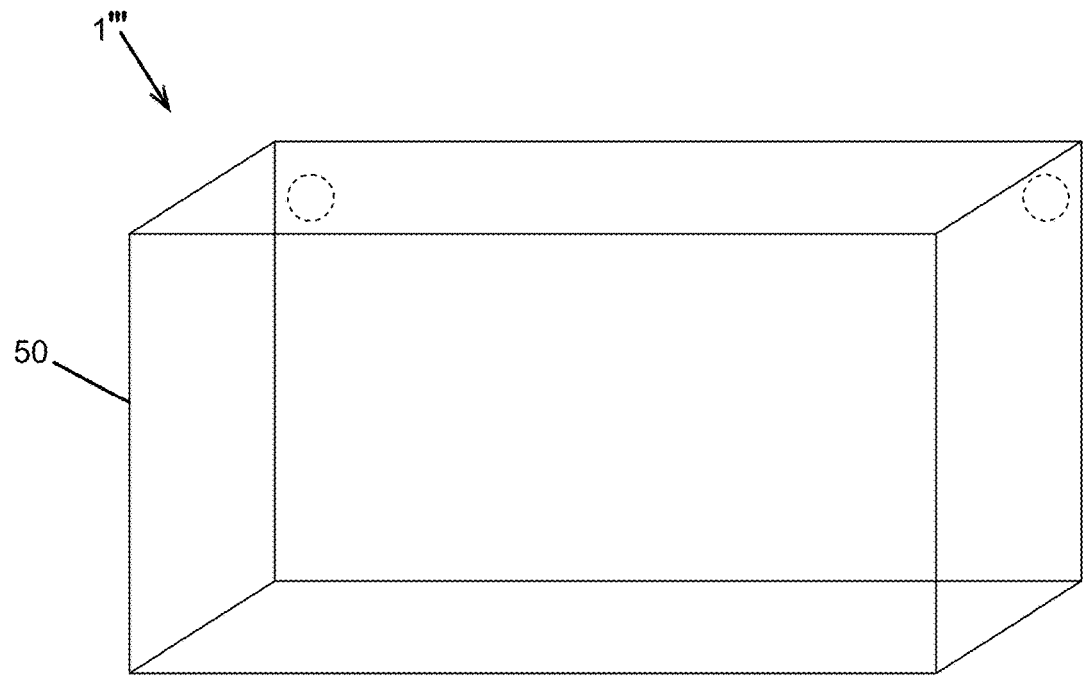
FIG. 8 is a schematic drawing of an insect trap according to an embodiment.
Figure 9B:
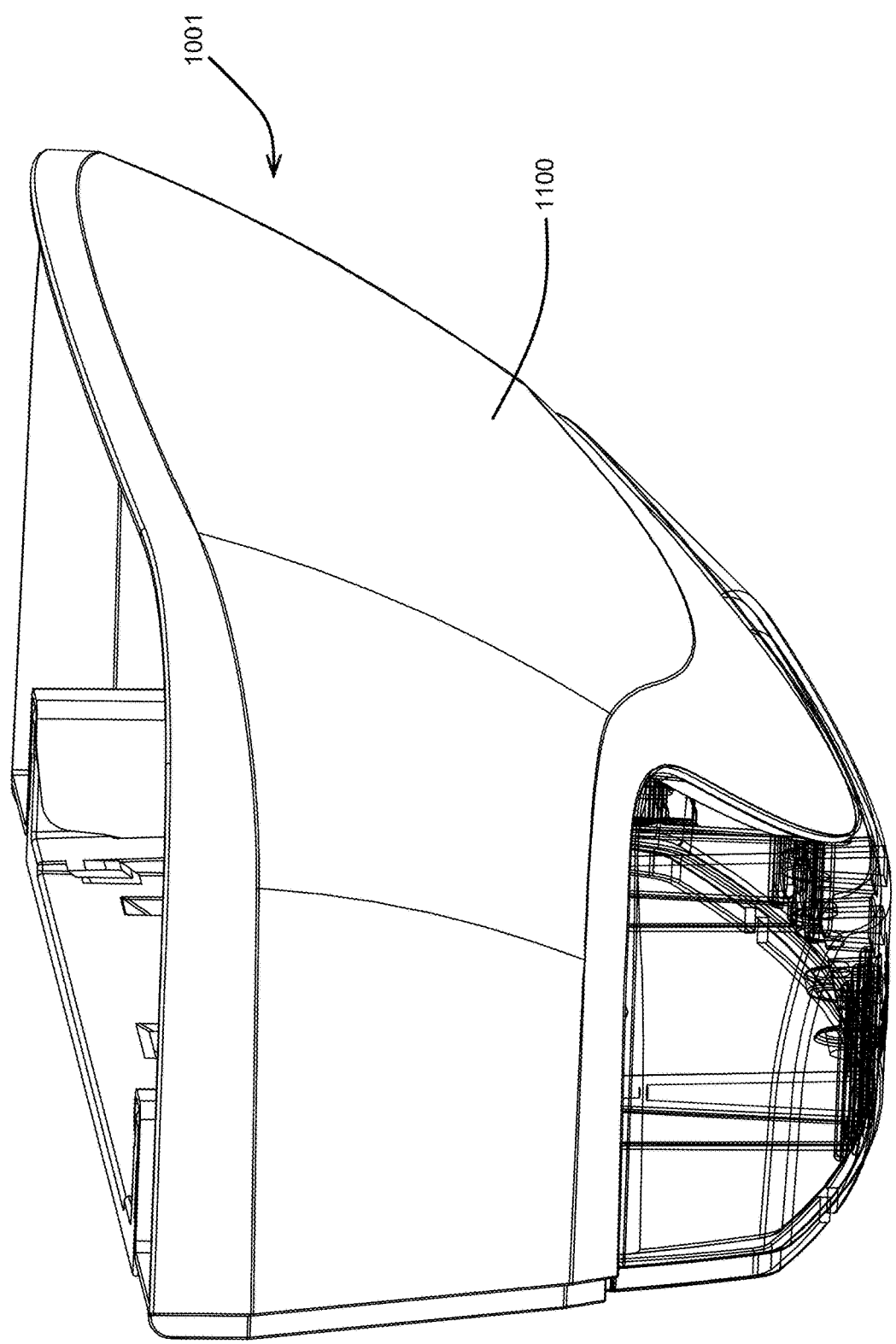
FIG. 9B is a perspective view of an exemplary housing for an insect trap according to an embodiment.
Figure 9C:
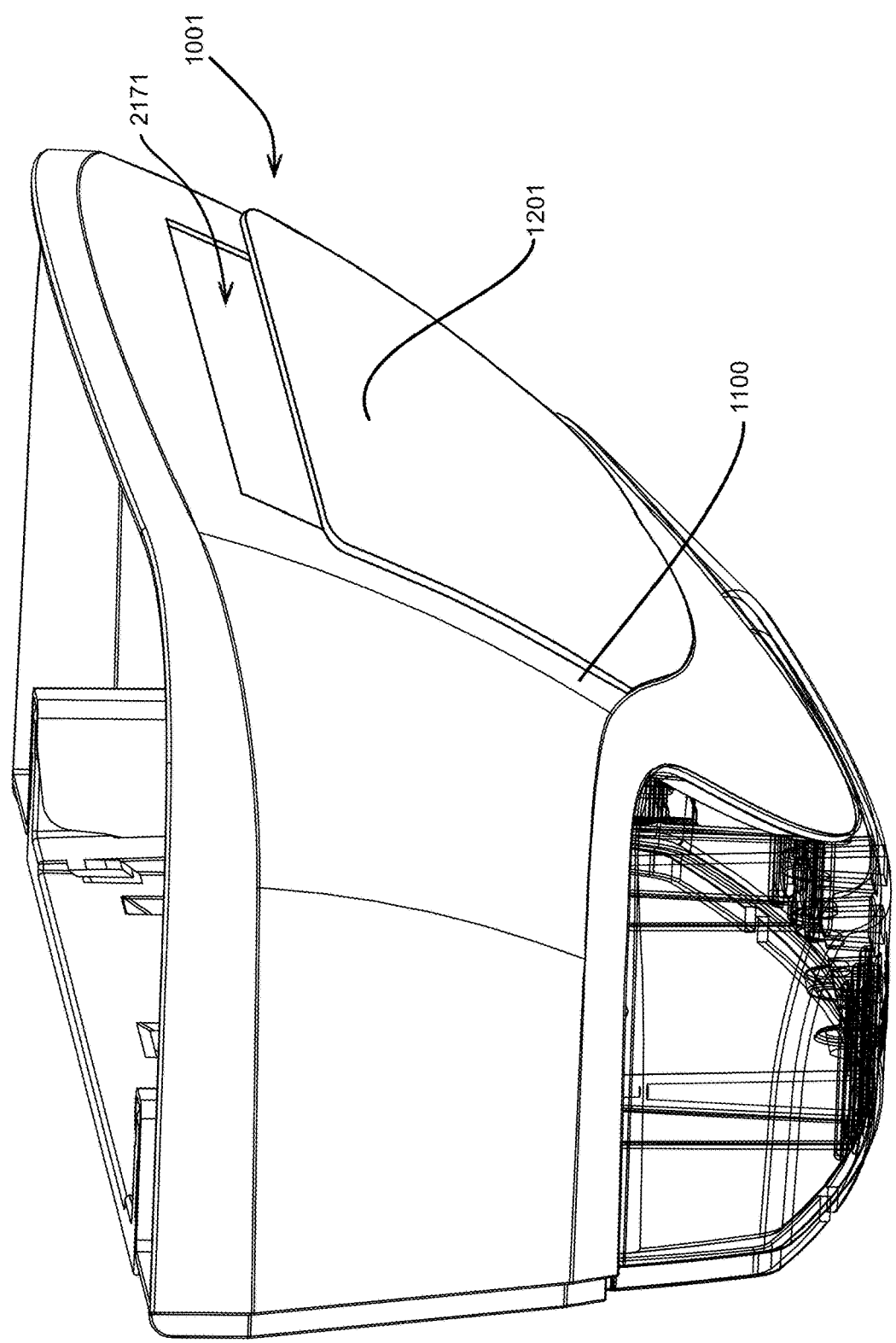
FIG. 9C is a perspective view of an exemplary housing for an insect trap according to another embodiment.
Figure 10:
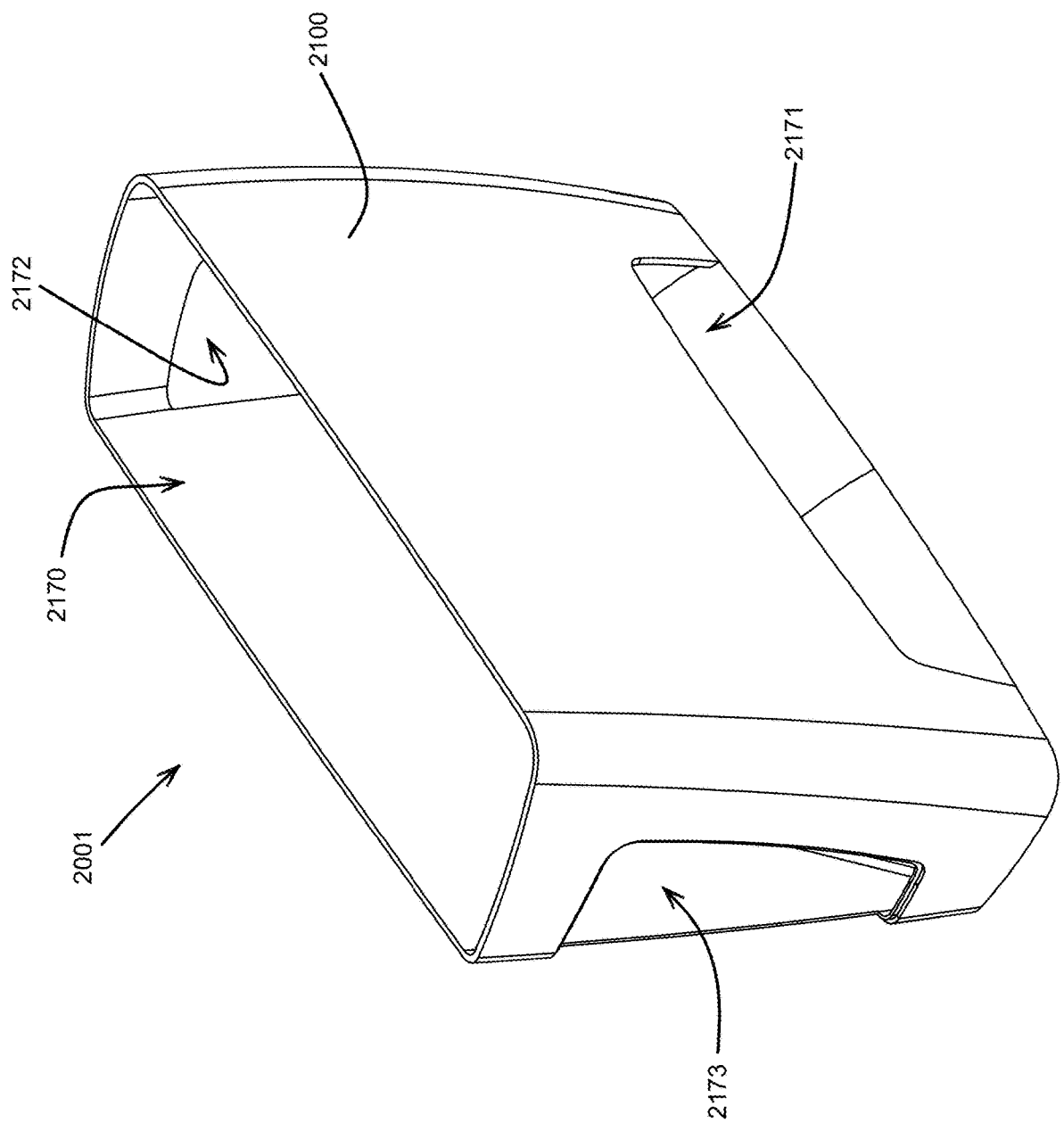
FIG. 10 is a perspective view of an exemplary housing for an insect trap according to an embodiment.

The light bulb 210 can be selected to emit a specific wavelength of light. For example, the light bulb 210 can emit light having a wavelength of about 340 to about 490 nm, about 365 to about 420 nm, about 380 to about 410 nm, about 385 to about 405 nm, or about 405 nm. The light source 200 can comprise a plurality of light bulbs 210, which can be selected to emit light at different wave lengths. For example, the light source 200 can comprise light bulbs that emit light at 380 to 400 nm and at 400 to 420 nm, or at about 385 nm and at about 405 nm. The insect trap 1 may also include a control mechanism 600 (e.g., a switch or other control, as shown in FIG. 7) to adjust or select the wavelength of the light source 200 to match the optimum light source for a target insect. According to an embodiment, the insect trap 200 includes a light source 200 with a plurality of LED lights that emit light at different wavelengths, and the light source 200 can be controlled to turn select LED lights on or off to control the wavelength(s) emitted by the light source 200.

In some embodiments, the insect trap 1 can be controlled by a control system. The control system can include, for example, the control mechanism 600 and a remote control access that can be used to control the light source 200 remotely (e.g., via infrared or Bluetooth™). The remote control access can be provided by the use of an emitter and a receiver 601 coupled with the insect trap 1 (e.g., with the power source or the light source 200), and can be controlled by a computer or mobile device application ("an app"). In some other embodiments, the insect trap 1 may comprise a timer for automatically turning the light source 200 on and off, or for dimming the light source 200 for a set period of time (e.g., during the night).

In certain embodiments, the light source 200 includes a directional light. The directional light can be, for example, a LED. The light source 200 is mounted in or on the housing 100 or frame. In some embodiments, the light source 200 is mounted on the inside of the housing 100, as shown in the exemplary embodiment in FIGS. 1-3, 6, and 7. The light source 200 is preferably mounted so that the directional light from the light source 200 can be directed at a surface. In an exemplary embodiment, the directional light from the light source 200 is directed at one or more surfaces inside the housing 100. For example, at least a portion of the directional light can be directed at the suppression element 300 (e.g., a glueboard). Another portion of the light can be directed at another surface, such as the back wall 160, the side walls 120, 130, the bottom 140, or the top 150 of the housing. If the light source 200 is mounted on a frame, and the frame is mounted on a wall, (e.g., by a mounting mechanism 190), a portion of the directional light can be directed at the wall. The insect trap 1 can be constructed so that a portion of the directional light directed at a surface of the housing 100 reflects off the surface and can be seen on the outside of the housing 100.

The insect trap 1 can be surrounded by an area defined as a catch zone 11 (FIG. 5). The catch zone 11 can be defined as the area within a 1 m radius of the insect trap 1, or within a 80 cm radius, a 60 cm radius, or a 40 cm radius of the insect trap 1. In some embodiments the catch zone is defined as an area surrounding the insect trap 1, such as an area on the wall where the insect trap 1 is mounted. In some embodiments, a majority of the light emitted by the light source 200 is selectively directed at a surface within the enclosure or within the catch zone. When light is emitted by the light source 200, the light can be referred to as first order light. When the light reflects off of a material (e.g., a surface), the reflected light can be referred to as second (or higher (e.g., third, fourth, fifth) order light. In some embodiments, a majority of the first order light emitted by the light source 200 is selectively directed at a surface within the enclosure or within the catch zone. For example, at least 50%, at least 60%, at least 70%, at least 80%, at least 90%, at least 95%, at least 96%, at least 97%, or at least 98% of the first order light can be directed at a surface within the enclosure or within the catch zone. In one embodiment, 99% or more of the first order light can be directed at a surface within the enclosure or within the catch zone.

Figure 6:
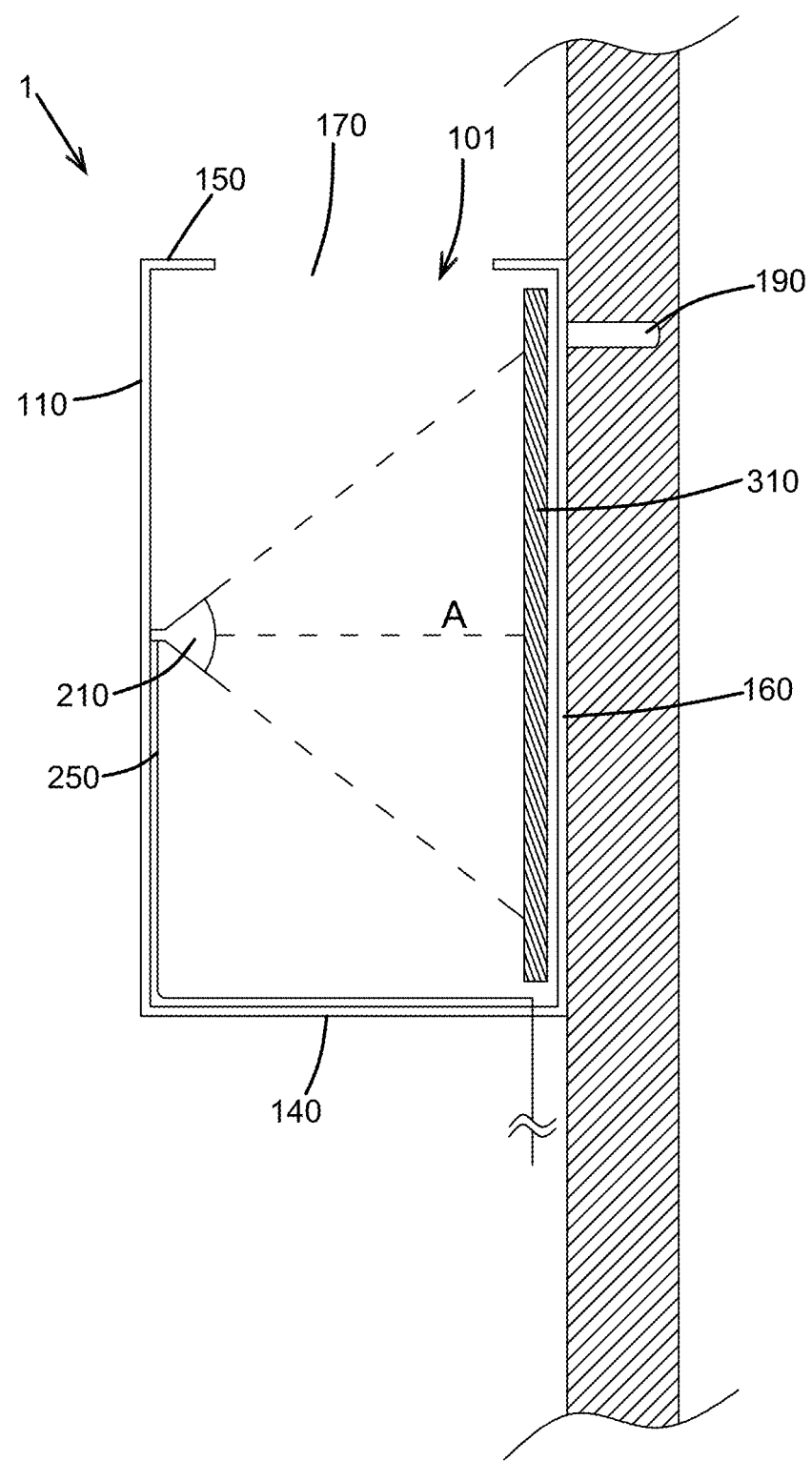
FIG. 6 is a cross-sectional view of the insect trap of FIG. 1 mounted on a wall.

The light beam emitted by a single directional light source (e.g., a single LED) has a central axis A shown schematically in FIG. 6. In some embodiments, the light source 200 is directed so that the central axis A of the light beam intersects an internal surface of the housing. If the insect trap 1 includes a plurality of directional light sources (e.g., LEDs), the central axis A of one or more of the plurality of light sources intersects an internal surface of the housing. In a further embodiment, all of the central axes A of the plurality of directional light sources 200 intersect a surface within the catch zone 11. The surface can be a surface of the housing 100 or a wall.

In some embodiments, first order light emitted by the light source 200 is directed at a glueboard 131 disposed inside the enclosure 101. First order light emitted by the light source 200 can also be directed at the back wall 160, the side walls 120, 130, the bottom 140, or the top 150 of the housing. A portion of second or higher order light reflected off the surfaces of the glueboard 131, back wall 160, or other internal surfaces (the side walls 120, 130, the bottom 140, or the top 150) of the enclosure 101 can escape the enclosure 101 through the opening 170.

As seen in FIG. 6, light emitted by the light source 200 can be directed at the glueboard 310. Directing light from the light source 200 toward a landing surface (e.g., the glueboard 310) may help increase the catch when the insect trap 1 is used to trap flies.

The insect trap 1 may also include a diffuser that diffuses light emitted from the light source 200. For example, the diffuser can be a translucent material (e.g., a translucent plastic or glass film) that causes light to diffuse. The diffuser can be placed in the light path either directly over the light source or further away. The light source 200 may also include a lens. A lens can be used to focus light or direct it in a desired direction.

The inside surfaces of the walls (front wall 110, side walls 120, 130, bottom 140, top 150, and/or back wall 160) can have a color or surface treatment with desired reflective properties. For example, the inside surface of one or more walls can be made of a reflective material or have a coating with reflective properties, such as a highly reflective (e.g., polished metal or mirror-like) material or color. An additional reflecting surface 500 can be positioned in the enclosure or at or near one of the openings to direct light emitted by the light source 200. For example, a baffle 201 can be positioned near a front facing opening so as to direct light away from a person who might be in front of the insect trap 1. Alternatively, the inside surfaces can have a low reflectance. In some embodiments, the inside surfaces of the walls have a dark color, such as black, dark gray, blue, brown, green, or other relatively dark color. If the insect trap 1 includes a glueboard 131, the glueboard 131 may be any suitable color. Commercially available colors include white and black, but other colors can also be used.

The outside surfaces of the insect trap 1 can have any suitable color, and can be matched to room décor, or can be camouflaged to mask the insect trap 1 to look like another object, such as a wall clock, a sign, a lighting device, a vent, etc. In some embodiments, the outside surface of the insect trap 1 has a dark color, such as black, dark gray, blue, brown, green, or other relatively dark color.

The insect trap 1 can be constructed to minimize safety hazards associated with UV light and with electric devices generally. For example, the housing 100 and the light source 200 can be configured to minimize the amount of UV radiation that escapes outside of the insect trap 1 or that could potentially reach persons in the proximity of the insect trap 1. The amount of UV radiation leaving the insect trap 1 can be minimized by the shaping of the housing 100, by directing the light source 200 appropriately, by reflecting the light (e.g., by the use of a reflecting surface 500) so that it remains mostly on the inside of the housing 100, and by using a narrow wavelength lightbulb. The housing can also be constructed to direct any radiation escaping from the enclosure in a direction where few humans are present, e.g., upward along a wall. In some embodiments, the amount of UV radiation leaving the insect trap 1 is minimized by controlling the direction, beam angle, and/or intensity of the light source 200. Such control can be achieved, for example, by the use of LED light bulbs. The insect trap 1 may also be configured to use a low voltage light source 200, such as low voltage LED light bulbs. In an exemplary embodiment, the light source 200 comprises 12 V LED lights.

The insect trap 1 further includes a suppression element 300. The suppression element 300 may be an adhesive surface (e.g., a glueboard) that immobilizes insects so that the insects can be removed from the space. The suppression element 300 may be removable and replaceable so that immobilized and dead insects can easily be removed. The suppression element 300 may also include an electric trap, such as a low-voltage trap that stuns insects or directs their flight path to an adhesive surface, or a higher voltage trap that electrocutes insects. An electric trap will be connected to the power source 250 of the insect trap 1.

The insect trap 1 may also include a power source 250. Any suitable power source 250 can be used that is sufficient to power the operational elements of the insect trap 1 (e.g., light source 200, controls, and electric trap, if included). The power source 250 can deliver either direct current (DC) or alternating current (AC) to the powered components of the insect trap 1. For example, the power source 250 can be an electric cord connecting the insect trap 1 to a power outlet, or a battery unit. In some embodiments, the insect trap 1 may include batteries and a connection to household power. In some embodiments, alternative sources of power, such as solar cells and/or rechargeable batteries, can be used. The power source 250 can be adapted to provide an amount of power required by the operational elements. For example, if the insect trap 1 includes LED lights, the power source 250 can be adapted to provide low voltage power (e.g., below 50 V). The insect trap 1 may also comprise a transformer coupled with the power source 250.

Figure 2:
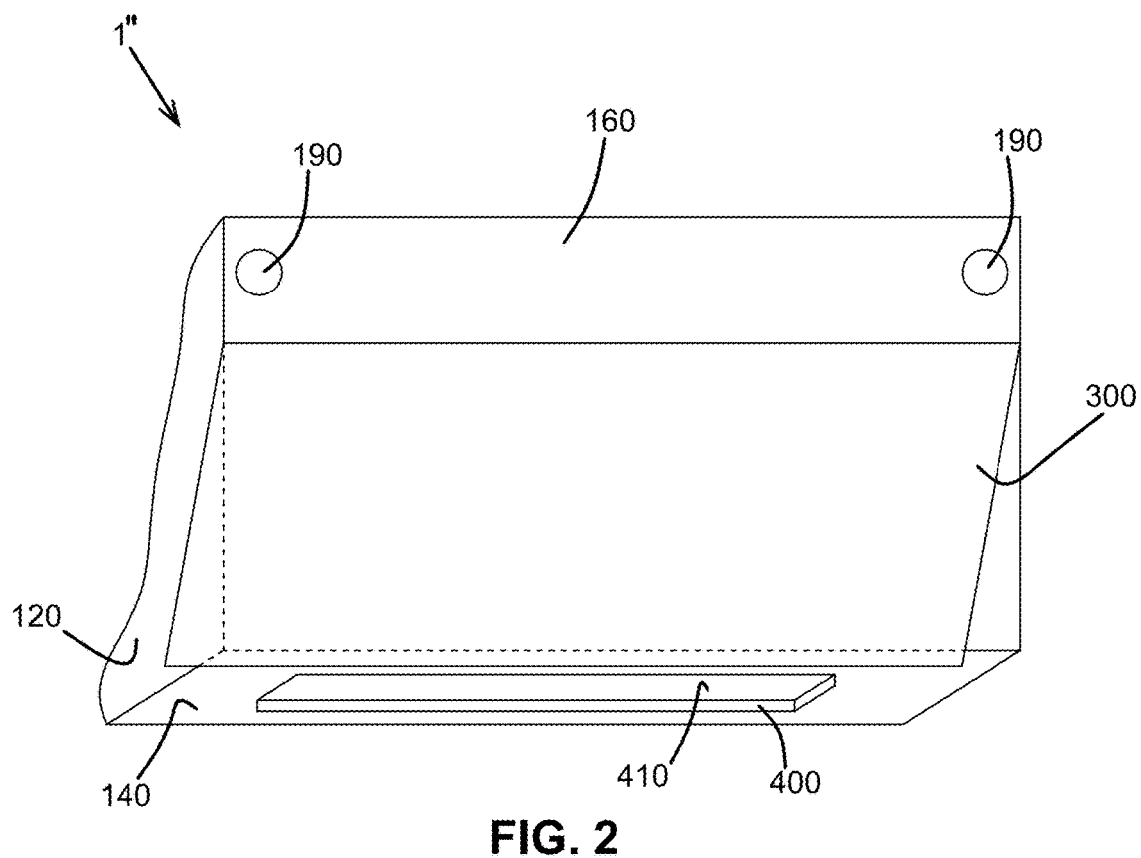
FIG. 2 is a partial cut-out of the insect trap of FIG. 1.
Figure 3:
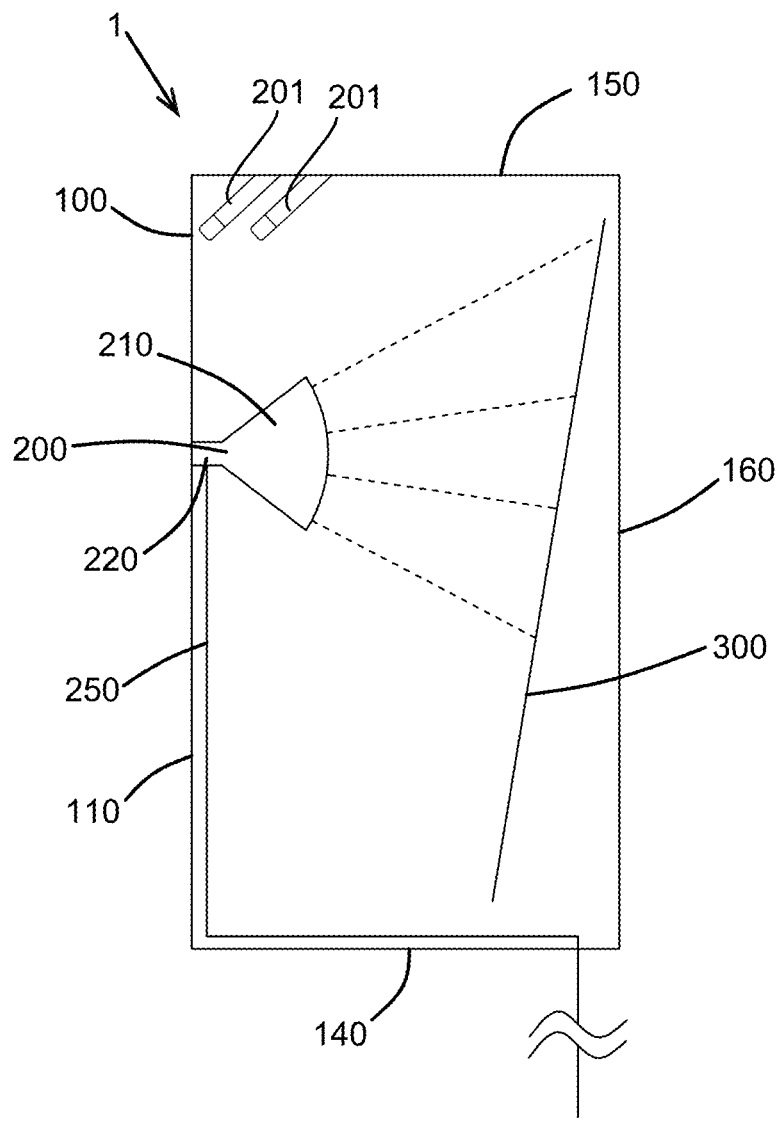
FIG. 3 is a cross-sectional view of the insect trap of FIG. 1.

As shown in FIG. 2, the insect trap 1" may optionally include a bait component 410, for example, mounted on a bait location 400 inside the housing 100. The bait component 410 may include any suitable insect bait or attractant, including a food source or a pheromone, and optionally an insecticide.

In an exemplary embodiment, the insect trap 1 comprises a housing 100 with a back wall 160 and an opening 170 at or near the top of the housing 100, a glueboard 131, and one or more light bulbs 210 mounted onto the housing 100. Light emitted from the one or more light bulbs 210 is directed at the glueboard 131 and the back wall 160. Light reflected off of the glueboard 131, the back wall 160, and other surfaces inside the housing 100 can exit through the opening 170 and illuminate a portion of the catch zone 11 around the housing 100.

FIGS. 9A, 9B, 9C, and 10 show alternative embodiments of the insect trap 1001, 2001 and housing 1100, 2100. The exemplary housing 1100 in FIG. 9C includes a front facing opening 2171 and a baffle 1201 near the opening. The exemplary housing 2100 in FIG. 10 includes a plurality of openings 2170, 2171, 2172, 2173 positioned at the top (2170), bottom front (2171), and sides (2172, 2173). The front opening 2171 may include a baffle that reflects light from the light source 200.

It has been discovered that light directed at surfaces of the enclosure (e.g., surfaces inside or adjacent to the enclosure) result in a higher catch than light directed generally into the room where the insect trap is positioned. Although light can be directed at multiple surfaces inside the enclosure, it has unexpectedly been discovered that light directed at the glueboard 131 and optionally the back wall 160 result in a higher catch than illuminating the entire enclosure. Further, a higher catch was achieved when the light bulb was directed at the glueboard 131 at a very close range, resulting in an intensely illuminated area of light on the glueboard 131 inside the enclosure.

The insect trap 1 comprises a housing 100 with a back wall 160 and an opening 170 at or near the top of the housing 100, a suppression element 300 (e.g., a glueboard 131), and one or more light bulbs 210 mounted onto the housing 100. The housing 100 may also include two, three, four, or more openings, which may be located on different sides (e.g., a first side, a second side, the front, and/or the bottom) of the housing 100. In some examples, one or more of the walls (e.g., a side wall 120, 130, the top 150, or the bottom 140) is absent, providing the opening 170. The insect trap 1 further comprises one or more light sources 200, where at least one of the light sources 200 includes a directional light. The light source 200 can include a socket 220 and a light bulb 210 mounted onto the socket 220. The light bulb 210 can emit light having a wavelength of about 340 to about 500 nm, about 365 to about 420 nm, about 380 to about 410 nm, about 385 to about 405 nm, or about 405 nm. The light source 200 can comprise a plurality of light bulbs 210, which can be selected to emit light at different wave lengths. For example, the light source 200 can comprise light bulbs that emit light at 360 to 400 nm, at 400 to 450 nm, at 450 to 500 nm, at 385 to 405 nm, at about 365 nm, at about 385 nm, at about 405 nm, or a combination thereof. At least one light bulb 210 is directed at the glueboard 131, the back wall 160, one or more side walls, the bottom 140, or a combination thereof. The insect trap 1 can be surrounded by an area defined as a catch zone 11 within a 80 cm radius, a 60 cm radius, or a 40 cm radius of the insect trap 1. A majority (e.g., at least 50%, at least 60%, at least 70%, at least 80%, at least 90%, at least 95%, at least 96%, at least 97%, or at least 98% of the first order light) of the light emitted by the light source 200 is selectively directed at a surface within the enclosure or within the catch zone. The insect trap 1 may also include a power source 250, optionally a bait component 410 mounted on a bait location 400 inside the housing 100, and a control mechanism 600 that can be used to control the light source 200 remotely. The control mechanism 600 may include a remote control and/or a timer.

The insect trap 1 may provide multiple benefits over prior art insect traps. For example, due to the use of LED light sources, the insect trap 1 has low energy usage and can be powered by low voltage power, thus reducing safety concerns. The LED light sources also generate less heat, increasing the life time of any plastic parts and the glue board of the insect trap 1. These benefits are at least partially enabled because of the surprising finding that a directional LED light can be used to attract flies at an efficiency that is similar to or sometimes even better than a fluorescent UV light. The implementation of LED light sources also enables the use of a narrower wavelength range that sometimes can be in the near UV (or UVA) range, or even outside of what is considered to be UV light (e.g., above 400 nm), reducing the potential exposure of humans to UV light escaping from the insect trap 1. LED light sources also enable the construction of smaller traps, making them less noticeable and fitting into smaller spaces.

EXAMPLES

The efficacy of various insect traps to trap and immobilize house flies was tested. The insect traps included a housing with an open top, a light source, a power source, and a glueboard. The housing was obtained from a commercially available fly trap, STEALTH® Maxima (available form Ecolab Inc., in St. Paul, MN). The housing was modified to accommodate LED lights.

Fly catch rates were evaluated as the number of flies caught in a half-hour period using a standard testing protocol. Laboratory strains of adult house flies (*Musica domestica* Linnaeus), approx. 13-15 days old (including the larval stage) were used. During each test period, 100 flies were released into the test room, resulting in a density of about 3.6 flies per $m^3$. The dimensions of the test room were approximately 19.5 ft×11 ft×7 ft. The test room was maintained at 80±5° F. and relative humidity 35±10% during testing. The room lights were kept on during testing. Flies were allowed to acclimate to the room for one hour, after which a fresh glueboard was placed in the trap. After 30 minutes, the glueboard was removed and the number of flies caught on the glueboard were counted. The number of flies in the room was replenished with the same number as were caught in the first catch. A new glueboard was placed in the trap, and the caught flies were again counted on after 30 minutes. The second catch was recorded. This process of replacing the glueboard was repeated several times to achieve statistically representative data.

In each Example, the housing was outfitted with LED lights as described. The LED lights were powered by house power, using a 12 V DC transformer.

Example 1

Figure 11:
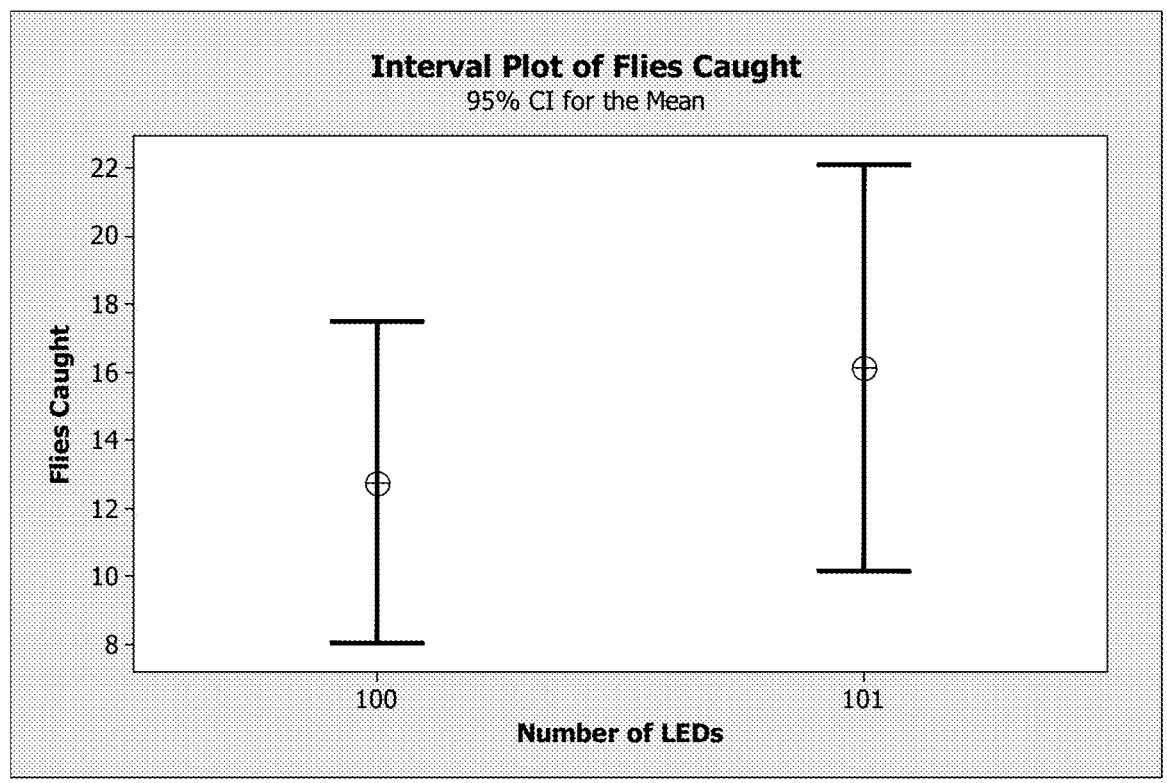
FIG. 11 is a graphical presentation of the results of Example 1.
Figure 12A:
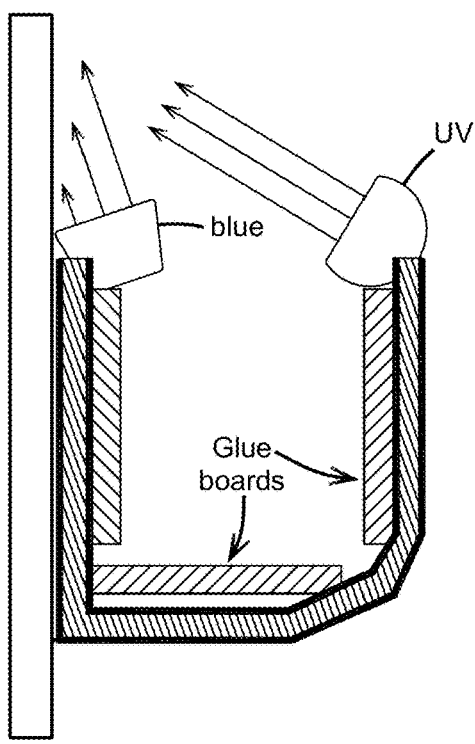
FIGS. 12A-12D show the experimental set-up in Example 2.
Figure 12B:
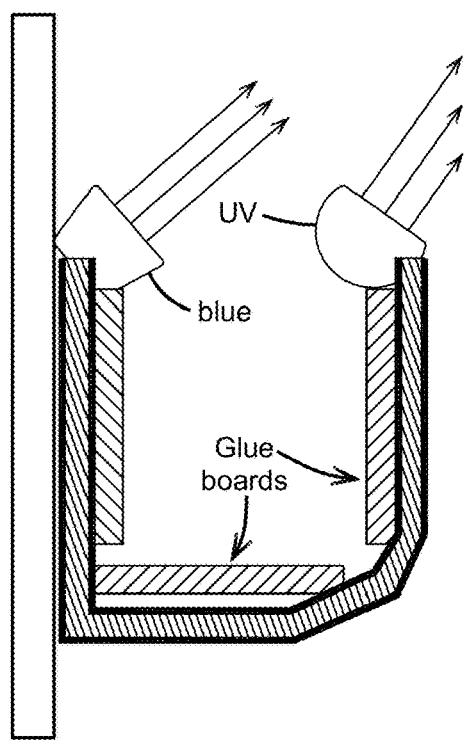
Figure 12C:
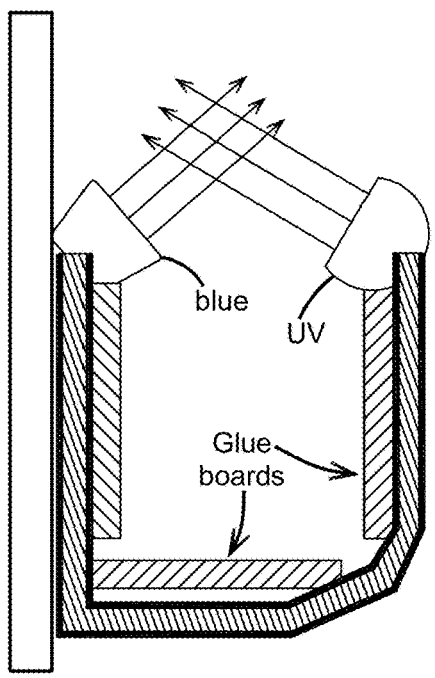
Figure 12D:
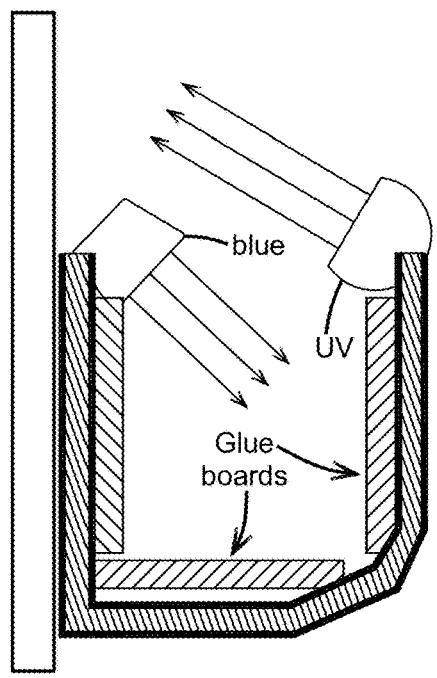

The effect of orienting LED lights and directing the light emitted from the LEDs was evaluated. In one set of experiments, 100 LEDs were oriented so that light from the LEDs was directed to the back wall of the housing and out into the testing room. In another set of experiments, one (1) LED component was oriented to direct the emitted light in toward the inside of the enclosure of the housing and 100 LEDs were oriented to direct light onto the back wall and out into the room. The mean catch was recorded. The results are shown in FIG. 11.

It was observed that including even one LED light directed to the inside of the enclosure increased the catch achieved by the 100 LEDs.

Example 2

The effect of orienting LED lights and directing the light emitted from the LEDs was evaluated. In each experiment, the housing was outfitted with two LED light sources, one emitting UV light (about 365 nm) and one emitting blue light (about 470 nm). The housing also included two glueboards, one on the inside of the front wall and one along the inside bottom, and a reflective board positioned along the back wall of the housing.

In the first experiment, both LED light sources were directed at the wall behind and above the housing. In the second experiment, both LED light sources were directed outward into the testing room. In the third experiment, the UV LED was directed at the wall behind and above the housing, and the blue LED was directed outward into the testing room. In the fourth experiment, the UV LED was directed at the wall behind and above the housing, and the blue LED was directed downward into the interior of the housing. The experimental set-up is schematically shown in FIGS. 12A-12D

Figure 13:
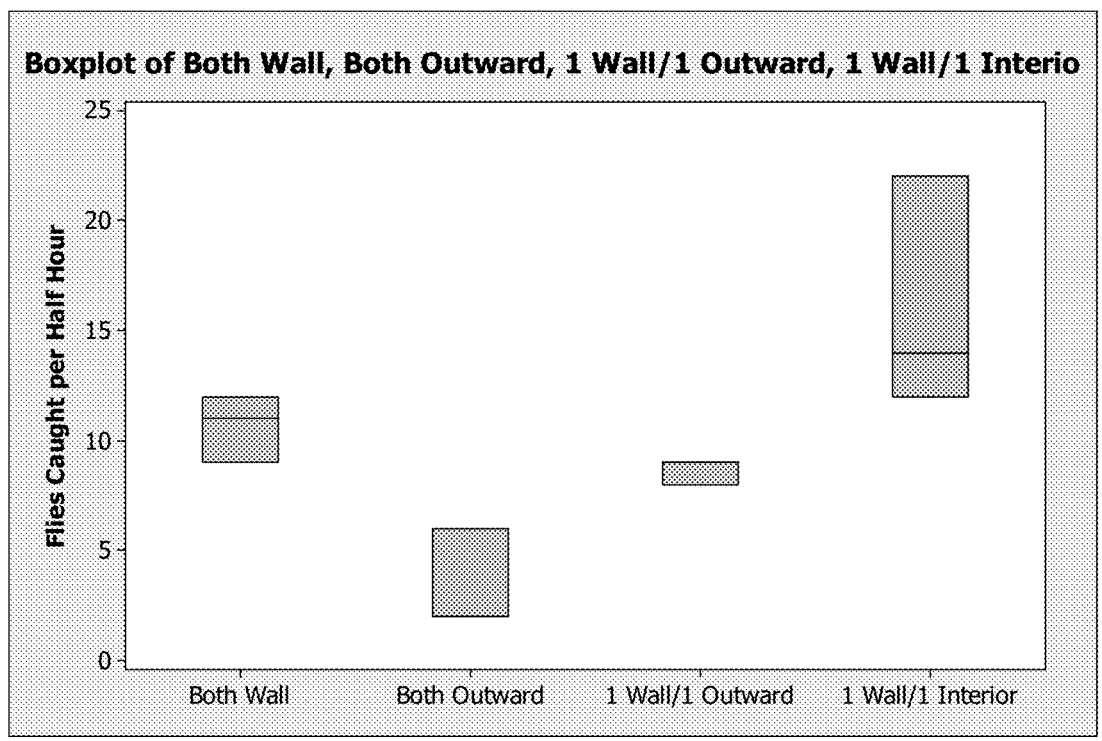
FIG. 13 is a graphical presentation of the results of Example 2.

The results are shown in the box plot diagram in FIG. 13. It was observed that both LEDs directed outward into the testing room resulted in the lowest catch, while directing one LED toward the interior of the housing resulted in the highest catch.

Example 3

The effect of blue or green light in addition to UV was evaluated. The housing was outfitted with LED light sources that emit either UV LED (about 365 nm) only, or UV light and either blue light (about 470 nm) or green light (about 510 nm). The housing was outfitted with one glueboard.

Figure 14:
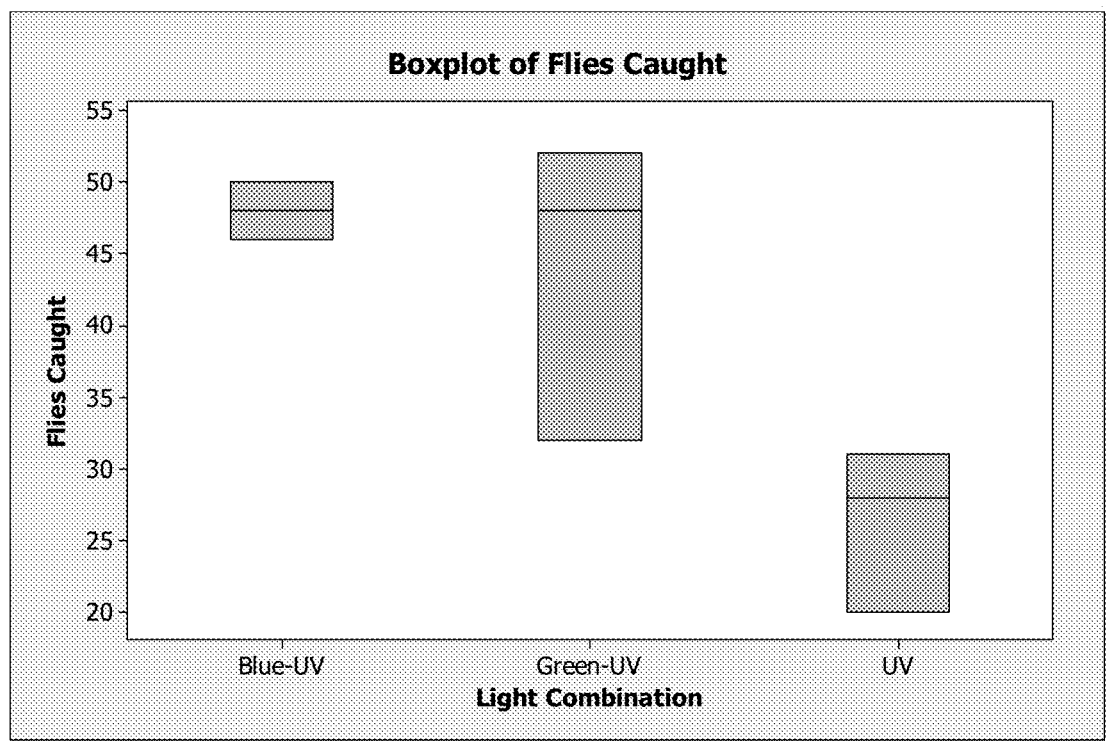
FIG. 14 is a graphical presentation of the results of Example 3.
Figure 15:
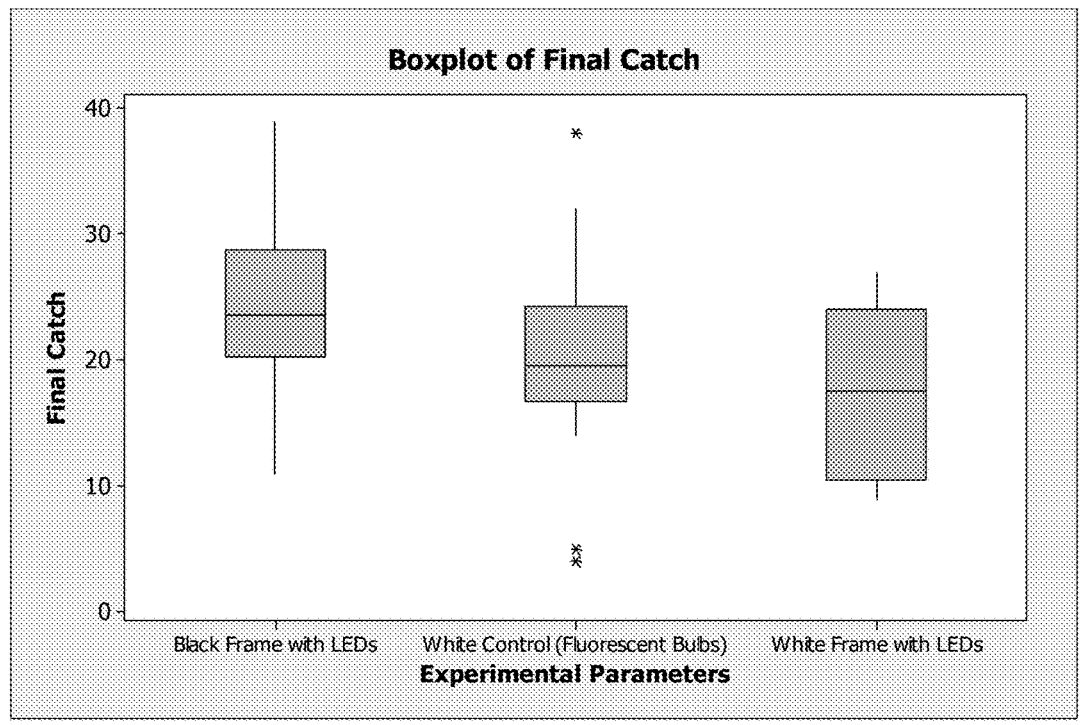
FIG. 15 is a graphical presentation of the results of Example 5.

The results are shown in the box plot diagram in FIG. 14. It was observed that both blue and green light added to the UV increased the catch over UV only.

Example 4

The effect of blue light in addition to UV was evaluated. The housing was outfitted with LED light sources that emit either UV light (about 365 nm) only, or UV light and blue light (about 470 nm). The housing was outfitted with one glueboard. In each experiment, two spot-light type lights were used, one positioned to direct light toward the glueboard and one angled upward toward the opening and along the back wall. The spot lights included three LED components.

The results are shown in TABLE 1 below. It was observed that blue light alone decreased the catch compared to UV alone, but that UV and blue light together achieved comparable results to UV alone.

TABLE 1

| Light Arrangement | Test 1 | Test 2 |
| --- | --- | --- |
| 2 UV | 22 | 15 |
| 2 Blue | 6 | 11 |
| UV + Blue; UV directed at glueboard, blue upward | 6 | 12 |
| UV + Blue; blue directed at glueboard, UV upward | 17 | 16 |

Example 5

Fly catch with a LED UV light source was compared to a fluorescent UV light source. In the LED set-up, two spot-light type lights were used, one positioned to direct light toward the glueboard and one angled upward toward the opening and along the back wall. The LED lights were tested with a black-colored housing and a white-colored housing. The fluorescent light was tested in the white-colored housing only. In the fluorescent set-up, two fluorescent light tubes were set up horizontally inside the housing.

Twelve experiments were run with each set-up, and results were recorded separately for experiments run in the morning and in the afternoon. The results are shown in FIG.

15. It was observed that the catch using the LED light source directed toward the glueboard and the back wall was comparable to the catch from using the fluorescent light source.

Example 6

A number of different fly traps with light sources were tested and compared. The tested fly traps were (in the order they are presented in FIG. 16):
- STEALTH® Maxima using two fluorescent bulbs, available from Ecolab Inc.
- STEALTH® Maxima frame using two LED spot lights, type 1
- GILBERT® 2002GT, available from Gilbert Industries, Inc., in Jonesboro, AR
- GARDNER™ GT-200, available from Gardner Products in Horicon, WI
- VECTOR® CLASSIC®, available from BASF Corporation in Florham Park, NJ
- PARACLIPSE® Insect Inn II, available from Paraclipse in Columbus, NE
- STEALTH® Maxima frame using two LED spot lights, type 2
- GARDNER™ WS-85, available from Gardner Products The STEALTH® Maxima frame was tested with the commercially available configuration of two fluorescent bulbs, as well as two different types (type 1 and type 2) of LED spot lights.

Figure 16:
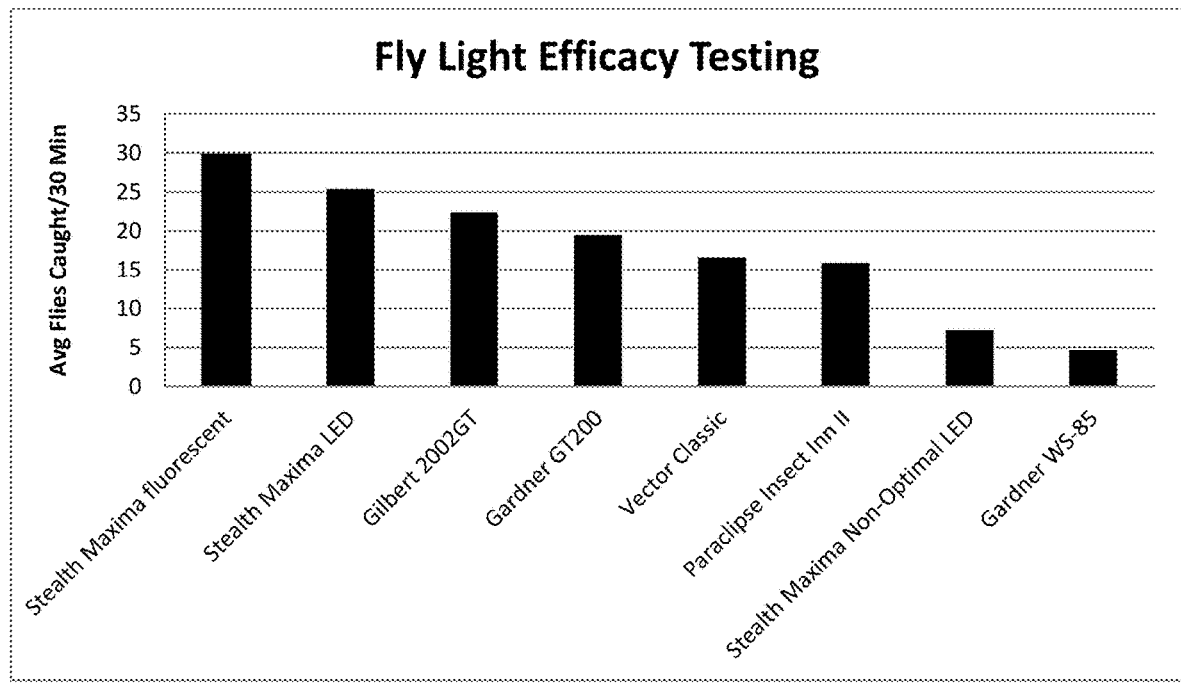
FIG. 16 is a graphical presentation of the results of Example 6.

The results are shown in FIG. 16. It was observed that the catch using two type 1 LEDs in the STEALTH® Maxima frame without further optimization to accommodate LEDs resulted in a catch that was almost as high as the STEALTH® Maxima with fluorescent bulbs and higher that competing devices.

Example 7

The effect of placing the light source closer to the glue board was studied. The insect trap was outfitted with two LED UV lights. One light was directed at a glueboard mounted on the back wall and positioned within about 2-3 inches from the glueboard. The other light was directed at a glueboard and positioned within about 3-4 inches from the glueboard mounted on the floor of the insect trap. The positioning of the lights resulted in a very intense spot light on the inside of the housing.

Figure 17:
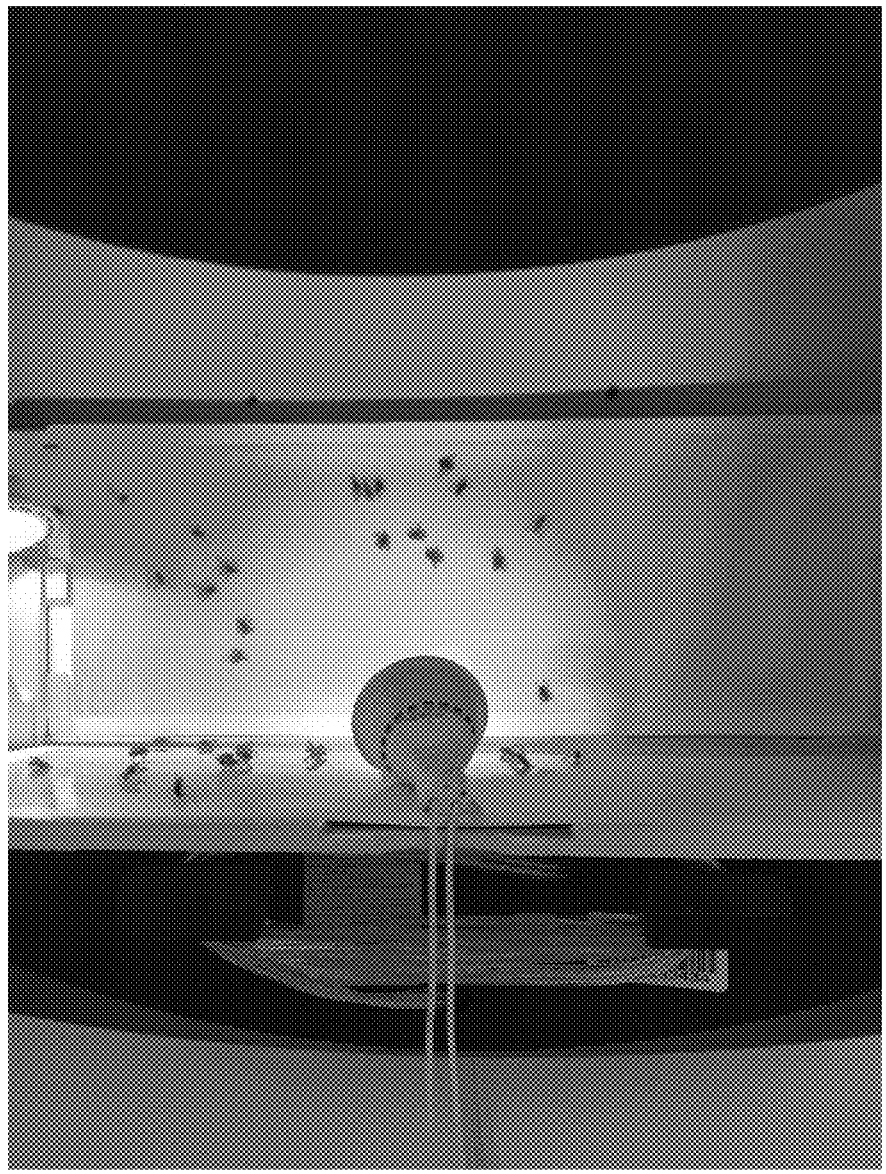
FIG. 17 is a photograph of an embodiment of the insect trap tested in Example 7.

FIG. 17 shows a photograph of the inside of the housing after testing. A concentration of flies can be seen in the most intensely lit area. It was observed that an improved catch could be achieved by the positioning of the light sources close to and directed at the glueboards.

Example 8

Figure 18:
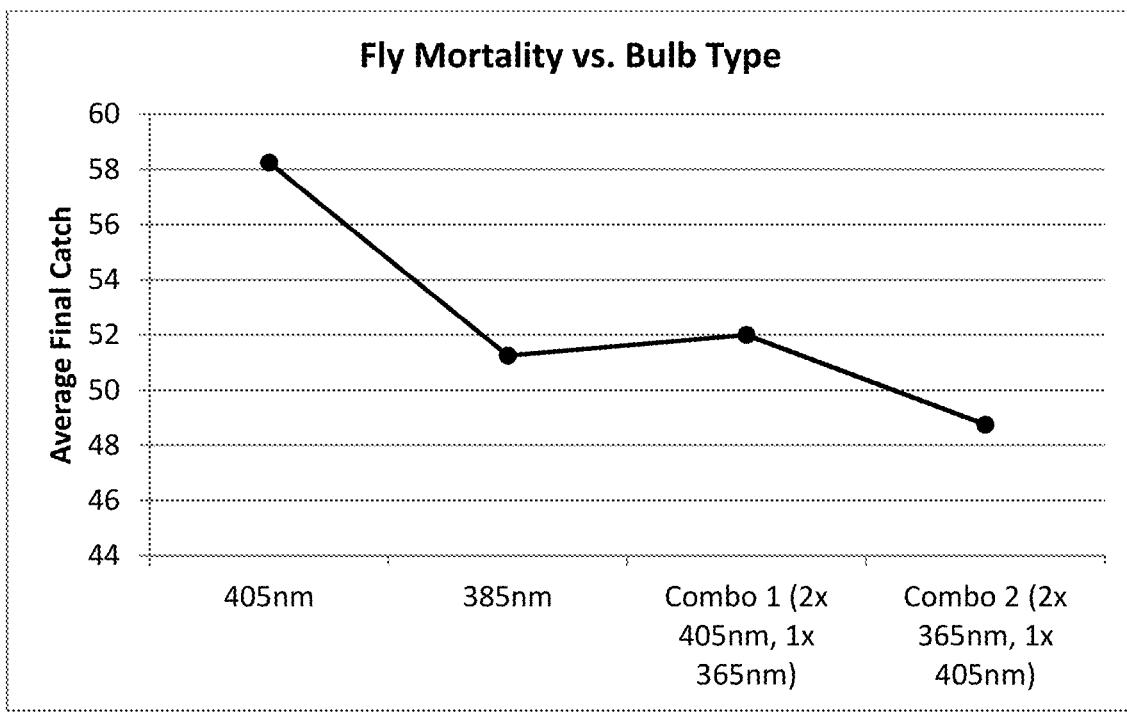
FIG. 18 is a graphical presentation of the results of Example 8.

The effect of various combinations of LED lights of different wavelengths was evaluated. Combinations of 365 nm, 385 nm, and 405 nm were tested according to TABLE 2. The trap was set up as in Example 5, where two spot-light type lights were used, one positioned to direct light toward the glueboard and one angled upward toward the opening and along the back wall. In the tests where only one wavelength is listed, two light bulbs were used. Where three light sources are listed (e.g., Combo 1: 2×405 nm and 1×365 nm), two lightbulbs were used, where each bulb included a combination of LEDs as indicated in the table. In all of the tests, the total power (wattage) used was the same regardless of the number of light sources. The overall average results are shown graphically in FIG. 18.

TABLE 2
Fly Catch Using Different Wave Length LED Bulbs.

| | Final Catch |
|---|---|
| Trial 1 | |
| 405 nm | 43 |
| 385 nm | 45 |
| Combo 1 (2 × 405 nm, 1 × 365 nm) | 30 |
| Combo 2 (2 × 365 nm, 1 × 405 nm) | 22 |
| Trial 2 | |
| 385 nm | 56 |
| Combo 2 (2 × 365 nm, 1 × 405 nm) | 60 |
| Combo 1 (2 × 405 nm, 1 × 365 nm) | 51 |
| 405 nm | 67 |
| Trial 3 | |
| Combo 2 (2 × 365 nm, 1 × 405 nm) | 60 |
| 405 nm | 48 |
| 385 nm | 43 |
| Combo 1 (2 × 405 nm, 1 × 365 nm) | 46 |
| Trial 4 | |
| Combo 1 (2 × 405 nm, 1 × 365 nm) | 81 |
| 405 nm | 75 |
| Combo 2 (2 × 365 nm, 1 × 405 nm) | 53 |
| 385 nm | 61 |
| Overall Averages | |
| 405 nm | 58.3 |
| 385 nm | 51.3 |
| Combo 1 (2 × 405 nm, 1 × 365 nm) | 52.0 |
| Combo 2 (2 × 365 nm, 1 × 405 nm) | 48.8 |

It was observed that the highest catch was obtained with the 405 nm LED bulb.

Example 9

Figure 19:
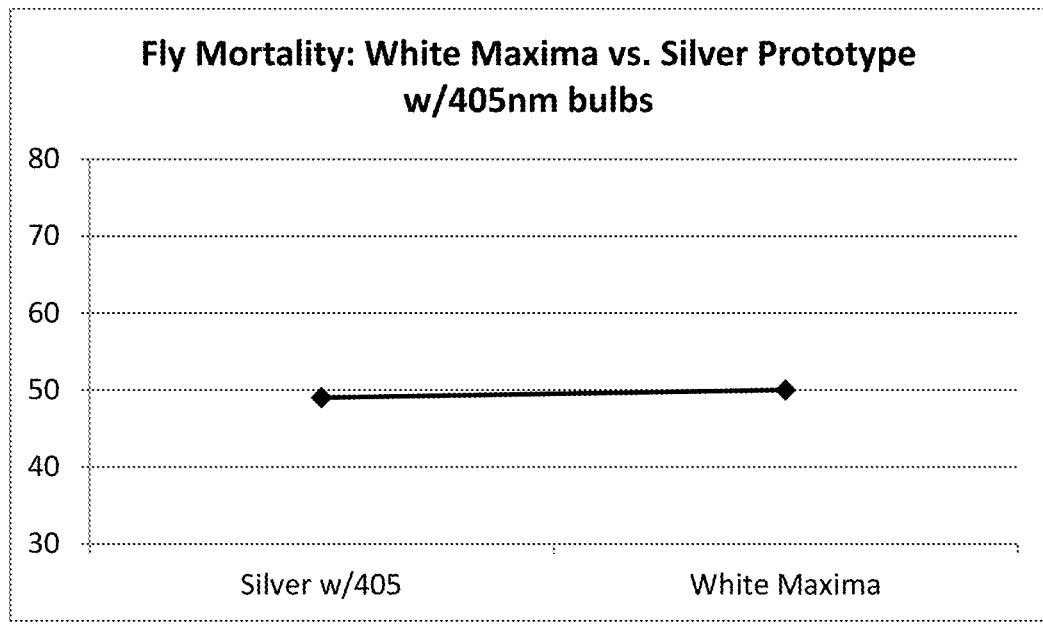
FIG. 19 is a graphical presentation of the results of Example 9.

The fly catch using a silver colored insect trap (prototype) with a 405 nm LED bulb according to the present disclosure was compared to a commercially available white insect trap (STEALTH® Maxima) with a fluorescent UV light bulb. The prototype trap was set up as in Example 5, where two spot-light type lights were used, one positioned to direct light toward the glueboard and one angled upward toward the opening and along the back wall. The results are shown in TABLE 3 and in FIG. 19.

TABLE 3
Comparison of Prototype and Commercially Available Trap.

| | Final Catch |
|---|---|
| Silver w/405 | 50 |
| White Maxima | 48 |
| Silver w/405 | 48 |
| White Maxima | 52 |
| Overall Averages | |
| Silver w/405 | 49 |
| White Maxima | 50 |

It was observed that the silver-colored prototype with the 405 nm LED bulb performed similarly to the commercially available insect trap.

Example 10

Figure 20:
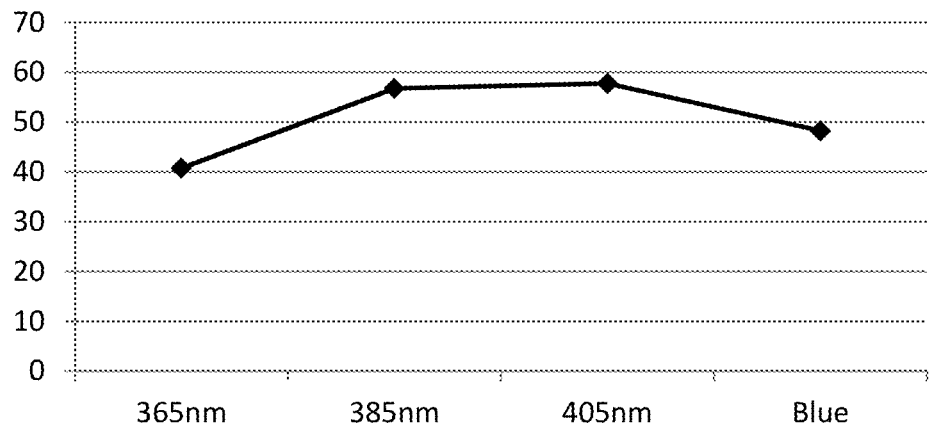
FIG. 20 is a graphical presentation of the results of Example 10.

The fly catch using LED lights at various wavelengths (blue light, 365 nm, 385 nm, and 405 nm) was tested. The trap was set up as in Example 5, where two spot-light type lights were used, one positioned to direct light toward the glueboard and one angled upward toward the opening and along the back wall. The results are shown in TABLE 4 and FIG. 20.

TABLE 4

Effect of Wavelength on Fly Catch.

| | Final Catch |
|---|---|
| Trial 1 | |
| 385 nm | 86 |
| 365 nm | 62 |
| Blue | 60 |
| 405 nm | 76 |
| Trial 2 | |
| 405 nm | 59 |
| 385 nm | 56 |
| 365 nm | 38 |
| Blue | 49 |
| Trial 3 | |
| Blue | 43 |
| 405 nm | 59 |
| 385 nm | 45 |
| 365 nm | 32 |
| Trial 4 | |
| 365 nm | 31 |
| Blue | 41 |
| 405 nm | 37 |
| 385 nm | 40 |
| Overall Averages | |
| 365 nm | 40.75 |
| 385 nm | 56.75 |
| 405 nm | 57.75 |
| Blue | 48.25 |

It was observed that the highest catch was obtained with the 405 nm LED bulb, followed very closely by the 385 nm LED bulb. It was further observed that the catch was significantly higher in the range of 385 to 405 nm than at 365 nm.

Example 11

Figure 21:
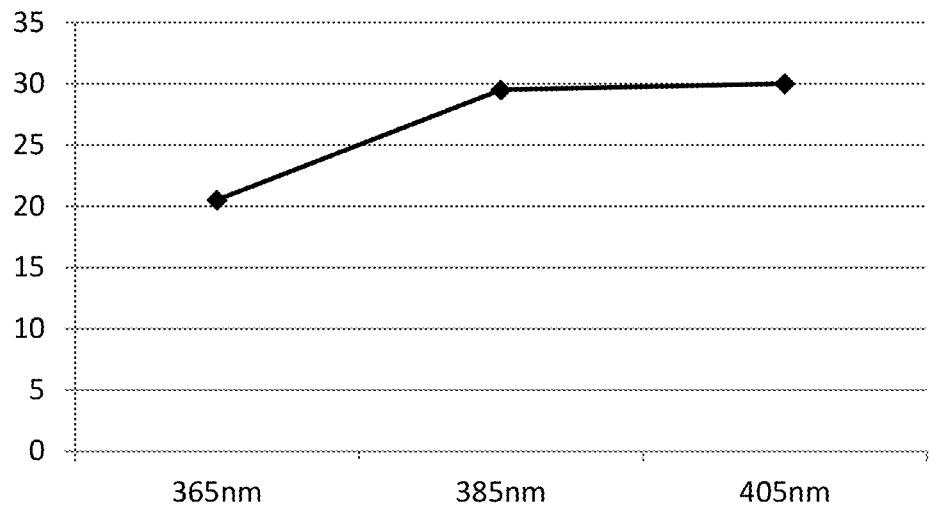
FIG. 21 is a graphical presentation of the results of Example 11.

The fly catch using LED lights at various wavelengths (365 nm, 385 nm, and 405 nm) was tested. The light bulbs were custom made NEXTERN bulbs available from Nextern Inc. in St Paul, MN. The trap was set up as in Example 5, where two spot-light type lights were used, one positioned to direct light toward the glueboard and one angled upward toward the opening and along the back wall. The results are shown in TABLE 5 and FIG. 21.

TABLE 5

Effect of Wavelength of Fly Catch.

| | Final Catch |
|---|---|
| Trial 1 | |
| 385 nm | 38 |
| 365 nm | 24 |
| 405 nm | 35 |
| Trial 2 | |
| 365 nm | 17 |
| 405 nm | 25 |
| 385 nm | 21 |
| Overall Averages | |
| 365 nm | 20.5 |
| 385 nm | 29.5 |
| 405 nm | 30 |

It was observed that the highest catch was obtained with the 405 nm LED bulb, followed very closely by the 385 nm LED bulb.

Example 12

Figure 22:
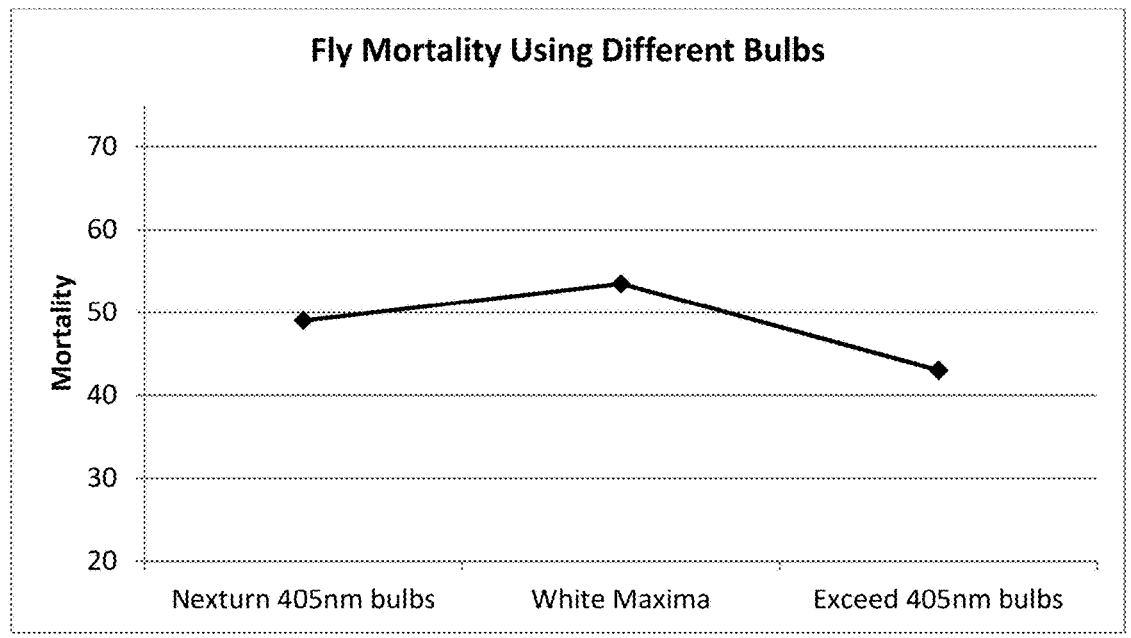
FIG. 22 is a graphical presentation of the results of Example 12.

The fly catch was tested using two different LED light bulbs in the prototype trap and a commercially available white insect trap (STEALTH® Maxima) with a fluorescent UV light bulb. The prototype trap was set up as in Example 5, where two spot-light type lights were used, one positioned to direct light toward the glueboard and one angled upward toward the opening and along the back wall. The LED light bulbs were 405 nm bulbs (EXCEED bulb available from Shenzhen Exceed Electronic Co. LTD, China, and NEXTERN bulb). The NEXTERN bulb differs from the EXCEED bulb in that the NEXTERN bulb has a frosted cover. The results are shown in TABLE 6 and FIG. 22.

TABLE 6

Fly Catch Using Different Bulbs.

| | Final Catch |
|---|---|
| Trial 1 | |
| EXCEED 405 nm bulbs | 41 |
| NEXTERN 405 nm bulbs | 52 |
| White Maxima | 65 |
| Trial 2 | |
| EXCEED 405 nm bulbs | 42 |
| NEXTERN 405 nm bulbs | 55 |
| White Maxima | 57 |
| Trial 3 | |
| White Maxima | 46 |
| EXCEED 405 nm bulbs | 46 |
| NEXTERN 405 nm bulbs | 43 |
| Trial 3 | |
| White Maxima | 46 |
| NEXTERN 405 nm bulbs | 46 |
| EXCEED 405 nm bulbs | 43 |
| Overall averages | |
| NEXTERN 405 nm bulbs | 49 |
| White Maxima | 53.5 |
| EXCEED 405 nm bulbs | 43 |

It was observed that while the White Maxima trap performed slightly better, the prototype with the LED bulbs also performed well, with the NEXTERN bulbs resulting in a slightly higher catch than the EXCEED bulbs.

Example 13

Figure 23:
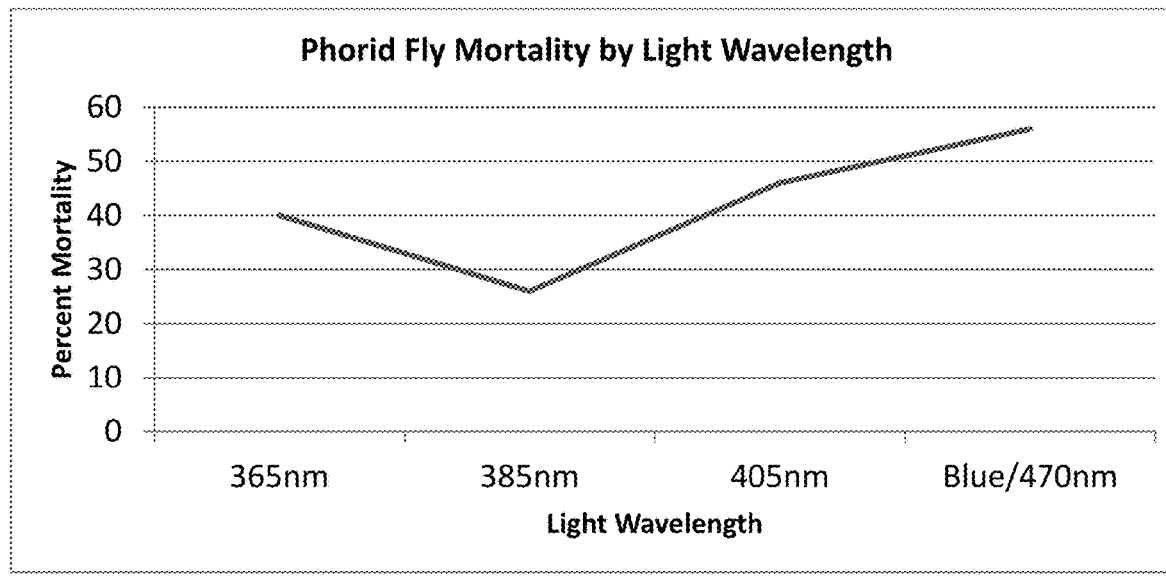
FIG. 23 is a graphical presentation of the results of Example 13.
Figure 24:
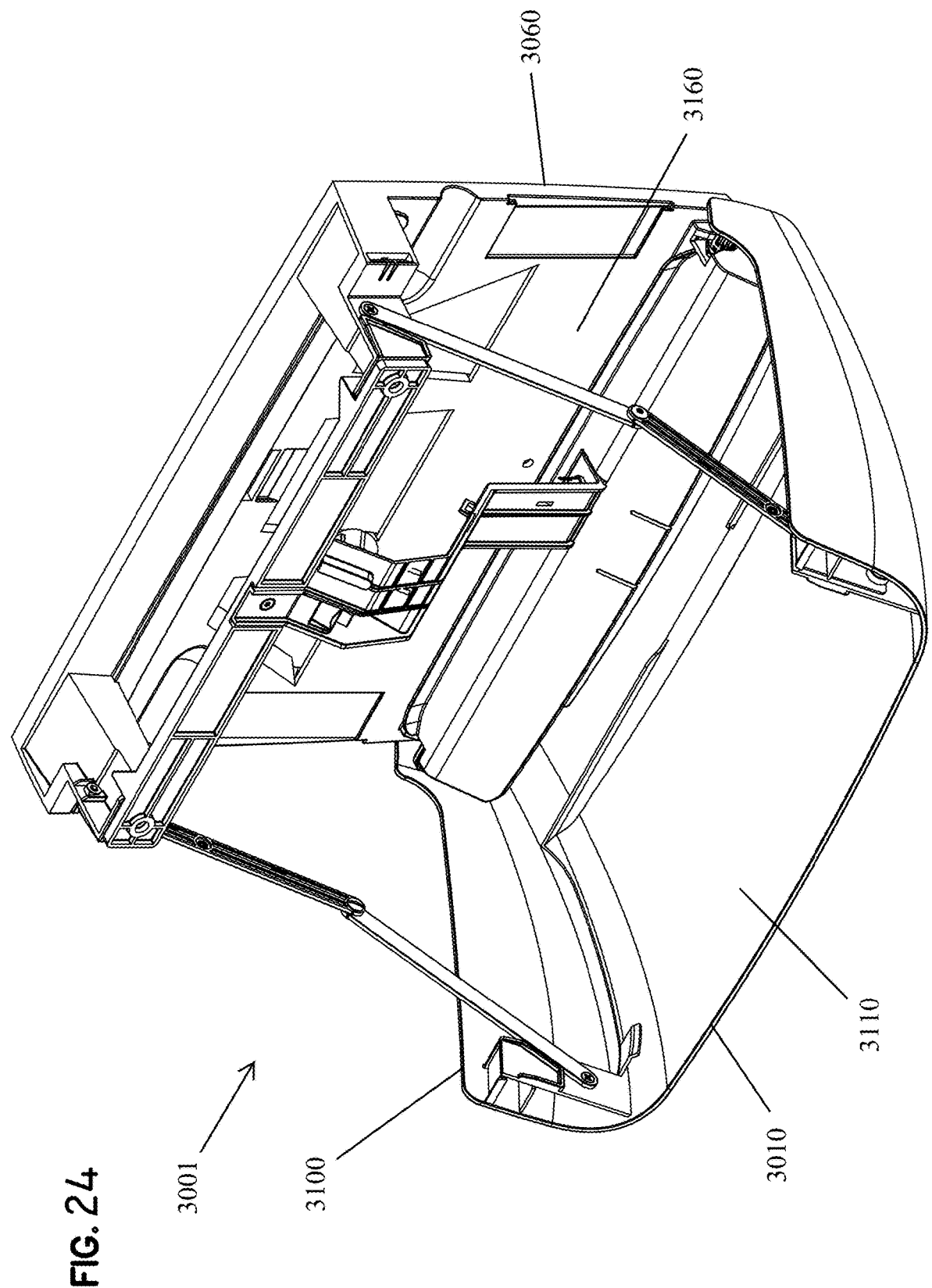
FIG. 24 is a front perspective view of an insect trap in an open position according to an embodiment.

The fly catch of phorid flies using LED lights at various wavelengths (blue light, 365 nm, 385 nm, and 405 nm) was tested. The trap was set up as in Example 5, where two spot-light type lights were used, one positioned to direct light toward the glueboard and one angled upward toward the opening and along the back wall. The test method was adjusted because phorid flies are smaller than the house flies used in other examples. In the test, 50 phorid flies were released in to a flight box made of clear acrylic and having an approximate size of 2 ft by 2 ft by 6.5 ft. The traps were tested one at a time for thirty minute intervals, and the order of testing was randomized. The trap being tested was placed inside the flight box against a wall, and a white paper was used to line the wall above the trap. The flies were released into the flight box, and the glue board of the trap was inspected after thirty minutes. The results are shown in TABLE 7 and FIG. 23.

TABLE 7

Effect of Wavelength on Phorid Fly Catch.

| Trial 1 | Final Catch (out of 50 flies released) | Percent Mortality |
|---|---|---|
| 365 nm | 15 | 30 |
| 385 nm | 23 | 46 |
| 405 nm | 23 | 46 |
| blue/470 nm | 29 | 58 |
| Trial 2 | Final Catch | |
| 365 nm | 25 | 50 |
| 385 nm | 3 | 6 |
| 405 nm | 23 | 46 |
| blue/470 nm | 27 | 54 |
| Overall Averages | | |
| 365 nm | | 40 |
| 385 nm | | 26 |
| 405 nm | | 46 |
| Blue/470 nm | | 56 |

It was observed that the highest catch was obtained with the blue (470 nm) LED bulb, followed by the 405 nm LED bulb. It was concluded that the insect trap can be adjusted for targeting different types of insects by changing the wavelength.

While certain embodiments of the invention have been described, other embodiments may exist. While the specification includes a detailed description, the invention's scope is indicated by the following claims. Furthermore, while the specification has been described in language specific to structural features and/or methodological acts, the claims are not limited to the features or acts described above. Rather, the specific features and acts described above are disclosed as illustrative aspects and embodiments of the invention. Various other aspects, embodiments, modifications, and equivalents thereof which, after reading the description herein, may suggest themselves to one of ordinary skill in the art without departing from the spirit of the present invention or the scope of the claimed subject matter.

The invention claimed is:

1. A trap for capturing flies comprising:
   (a) a front wall and a back wall, the front wall and back wall defining an interior space;
   (b) a first glueboard mounted on the back wall inside of the interior space;
   (c) a first LED light having a wavelength from about 340 nm to about 420 nm and pointed at the first glueboard, wherein at least 50% of a light beam from the first LED light intersects an internal surface of the trap where the first glueboard is mounted;
   (d) a second LED light pointed outside of the trap and having a wavelength from about 420 nm to about 490 nm; and
   (e) a power source.

2. The trap of claim 1, further comprising an opening for flies to enter the trap.

3. The trap of claim 2, wherein the opening is at least 7.62 centimeters (3 inches) in its smallest dimension.

4. The trap of claim 1, wherein the front wall is moveable.

5. The trap of claim 1, wherein the front wall is removable.

6. The trap of claim 1, wherein the first glueboard is removable.

7. The trap of claim 1, wherein the first glueboard is replaceable.

8. The trap of claim 1, wherein the first glueboard is a color selected from the group consisting of white and black.

9. The trap of claim 1, wherein the first LED light or the second LED light is a low voltage LED.

10. The trap of claim 9, wherein the voltage is less than 50 V.

11. The trap of claim 1, wherein the power source is a battery unit.

12. The trap of claim 11, wherein the battery unit is rechargeable.

13. The trap of claim 1, wherein the power source is an electric cord configured to connect to a power outlet.

14. The trap of claim 1, further comprising a bait.

15. The trap of claim 14, wherein the bait is selected from the group consisting of a food source, a pheromone, and combinations thereof.

16. The trap of claim 1, further comprising a second glueboard mounted on the front wall inside of the interior space.

17. The trap of claim 1, further comprising an insecticide.

* * * * *